United States Patent
Tagami et al.

(10) Patent No.: US 10,529,365 B2
(45) Date of Patent: Jan. 7, 2020

(54) METHOD FOR CORRECTING POSITION OFFSET OF THE HEADS ON TWO DIMENSIONAL MAGNETIC RECORDING DEVICE

(71) Applicants: Kabushiki Kaisha Toshiba, Minato-ku, Tokyo (JP); Toshiba Electronic Devices & Storage Corporation, Minato-ku, Tokyo (JP)

(72) Inventors: Naoki Tagami, Yokohama Kanagawa (JP); Takeyori Hara, Kawasaki Kanagawa (JP); Gaku Koizumi, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/112,922

(22) Filed: Aug. 27, 2018

(65) Prior Publication Data

US 2019/0198050 A1  Jun. 27, 2019

(30) Foreign Application Priority Data

Dec. 26, 2017 (JP) ................................. 2017-249831

(51) Int. Cl.

| G11B 5/596 | (2006.01) |
|---|---|
| G11B 5/54 | (2006.01) |
| G11B 5/48 | (2006.01) |
| G11B 15/02 | (2006.01) |
| G11B 5/49 | (2006.01) |
| G11B 19/02 | (2006.01) |

(52) U.S. Cl.
CPC ............ *G11B 5/59627* (2013.01); *G11B 5/48* (2013.01); *G11B 5/49* (2013.01); *G11B 5/4969* (2013.01); *G11B 5/4976* (2013.01); *G11B 5/54* (2013.01); *G11B 15/02* (2013.01); *G11B 19/02* (2013.01)

(58) Field of Classification Search
USPC ... 360/75, 27, 29, 21–24, 39, 53, 55, 60–64, 360/70, 71, 76, 77.02
See application file for complete search history.

(56) References Cited

U.S. PATENT DOCUMENTS

| 6,754,030 B2* | 6/2004 | Seng ................. G11B 5/59627 360/31 |
| 8,824,083 B1* | 9/2014 | Kientz .................. G11B 5/584 360/55 |

(Continued)

FOREIGN PATENT DOCUMENTS

JP   2011-134372 A   7/2011

*Primary Examiner* — Tan X Dinh
(74) *Attorney, Agent, or Firm* — White & Case LLP

(57) ABSTRACT

According to one embodiment, a magnetic disk device includes a disk, a head including a write head and a first and a second read head, and a controller configured to generate a correction value based on placement information on the write head and the first and the second read head, a first distance between the first read head and the second read head in a case where the first read head is placed at a first position of the disk, and a second distance between the first read head and the second read head in a case where the first read head is placed at the first position, and to correct positions of the heads based on the correction value in a case where first data written with the first read head placed at the first position is read.

20 Claims, 20 Drawing Sheets

(56) References Cited

U.S. PATENT DOCUMENTS

| | | | |
|---|---|---|---|
| 9,019,650 B1* | 4/2015 | Shan | G11B 5/48 |
| | | | 360/75 |
| 9,311,937 B2 | 4/2016 | Zou et al. | |
| 9,373,355 B1* | 6/2016 | Mendonsa | G11B 20/10046 |
| 9,564,157 B1 | 2/2017 | Trantham et al. | |
| 9,583,131 B1* | 2/2017 | Sugiyama | G11B 5/59627 |
| 9,972,349 B1* | 5/2018 | French, Jr. | G11B 5/012 |
| 10,014,026 B1* | 7/2018 | Wu | H03K 5/135 |
| 2015/0022916 A1* | 1/2015 | Zou | G11B 5/455 |
| | | | 360/31 |
| 2018/0144764 A1* | 5/2018 | Trantham | G11B 5/29 |

* cited by examiner

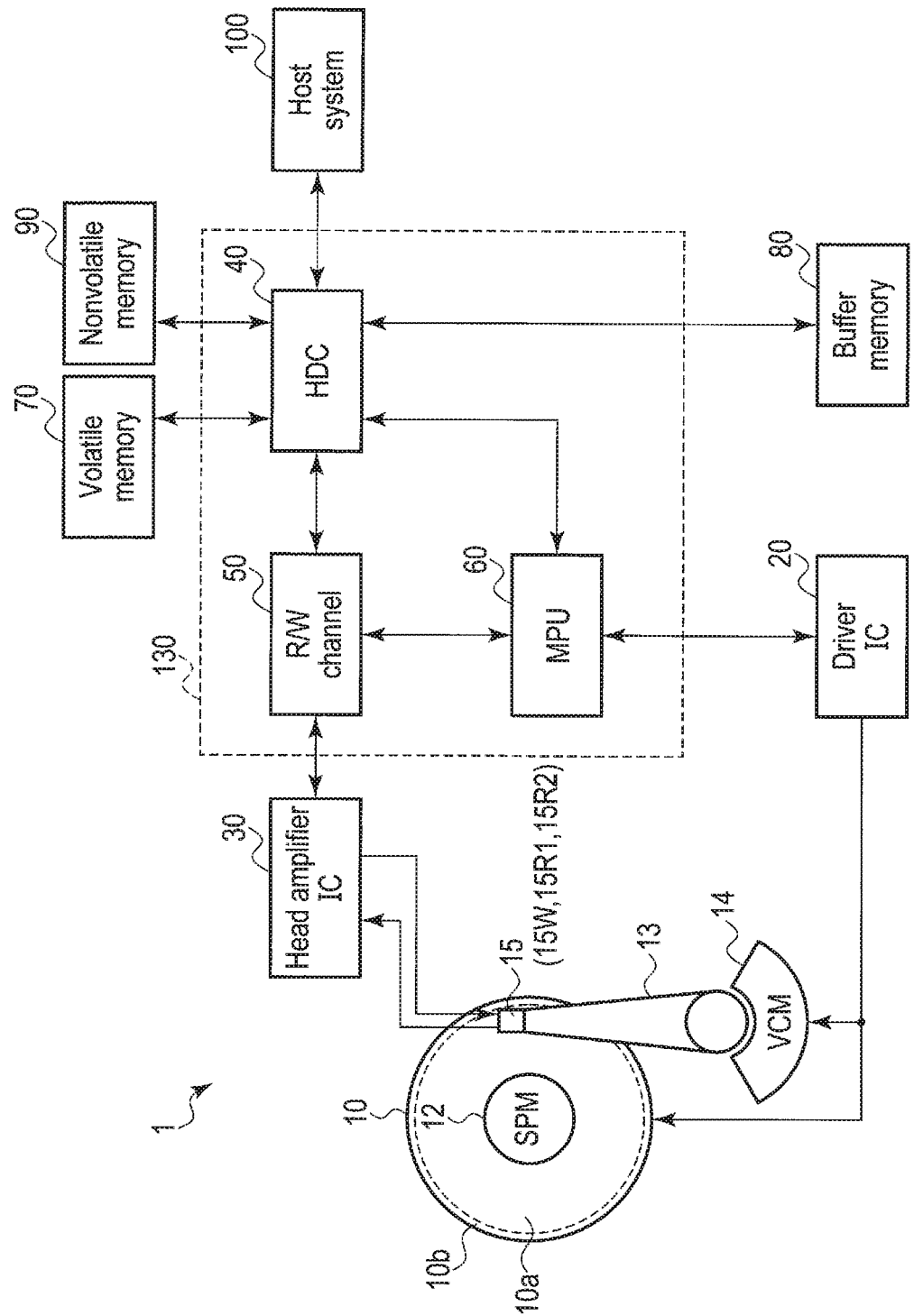
F I G. 1

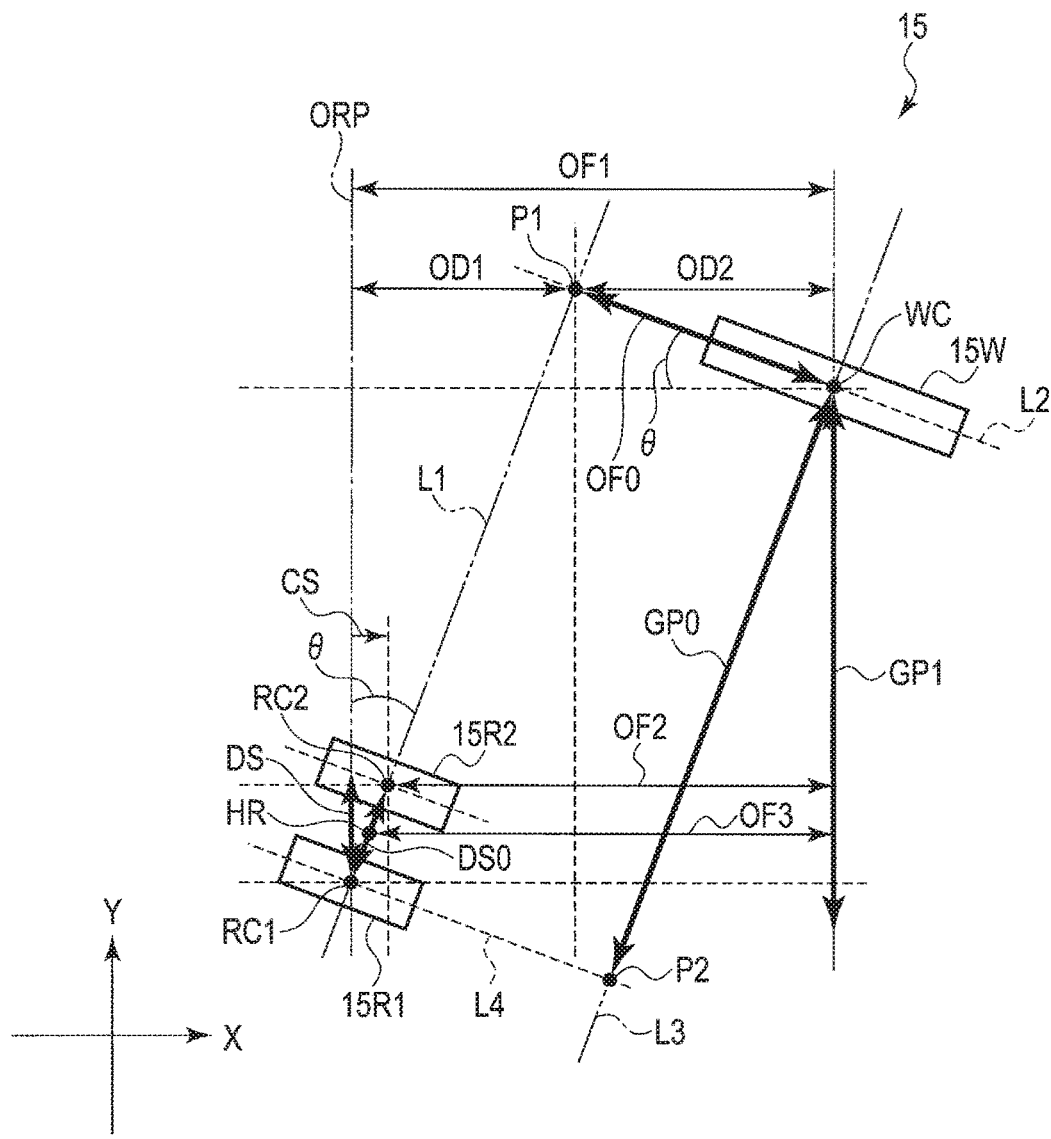
F I G. 3B

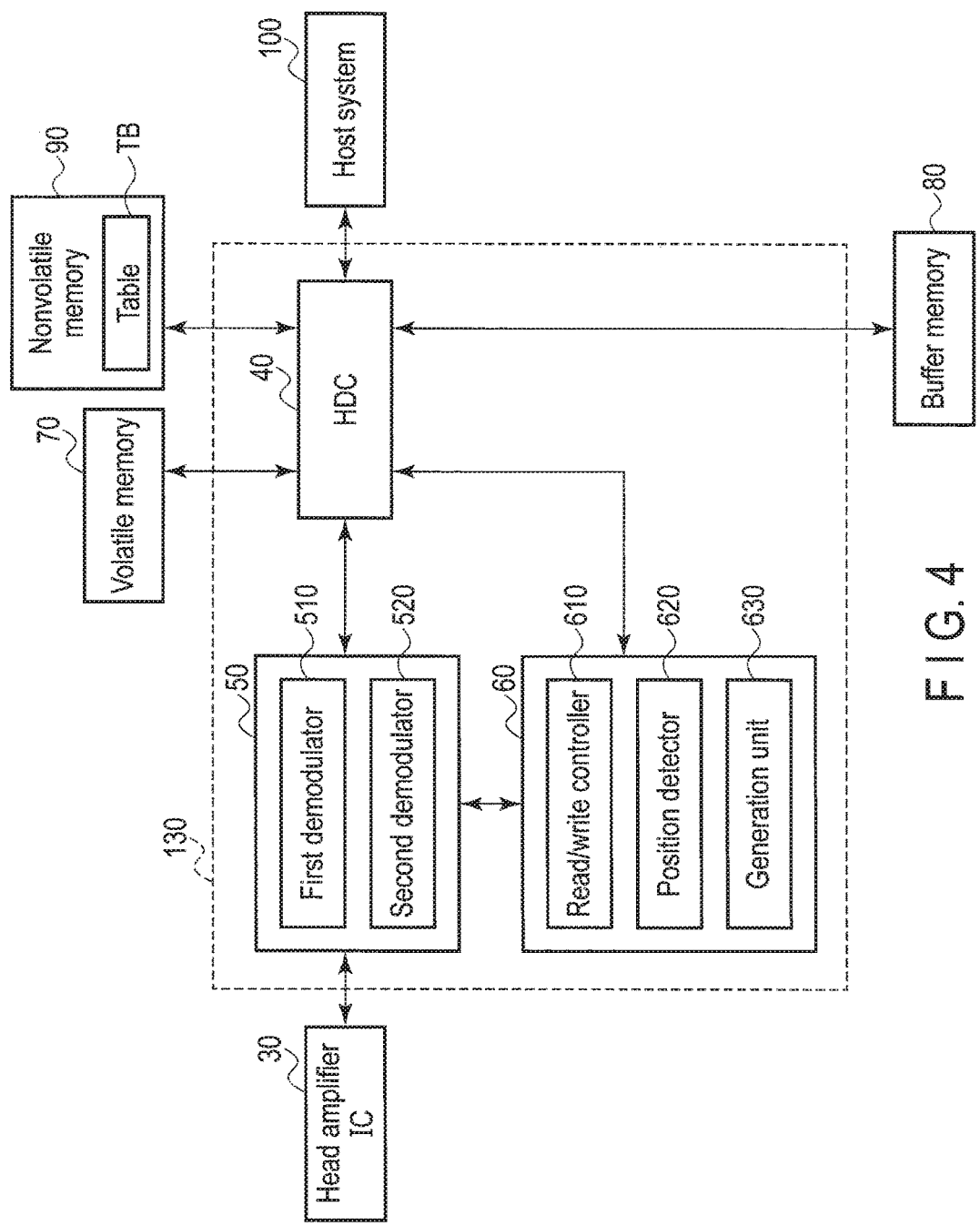
F I G. 4

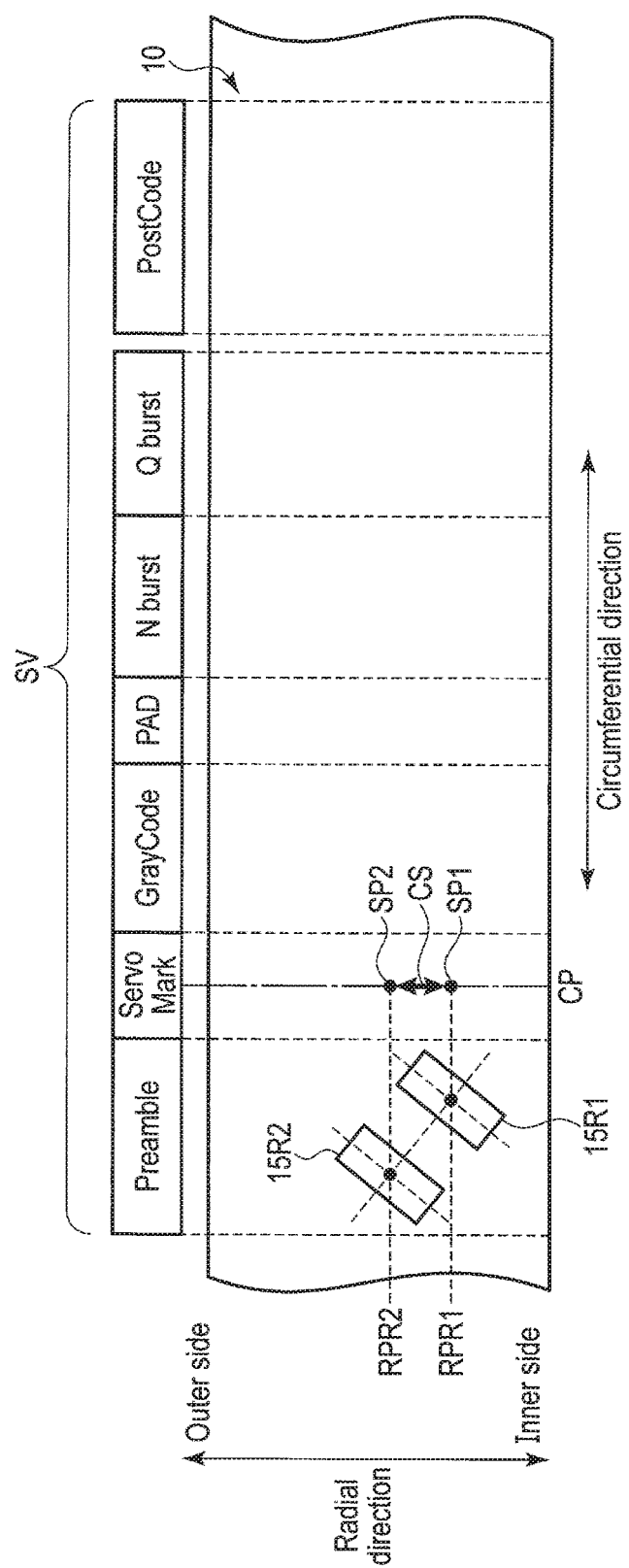
F I G. 5

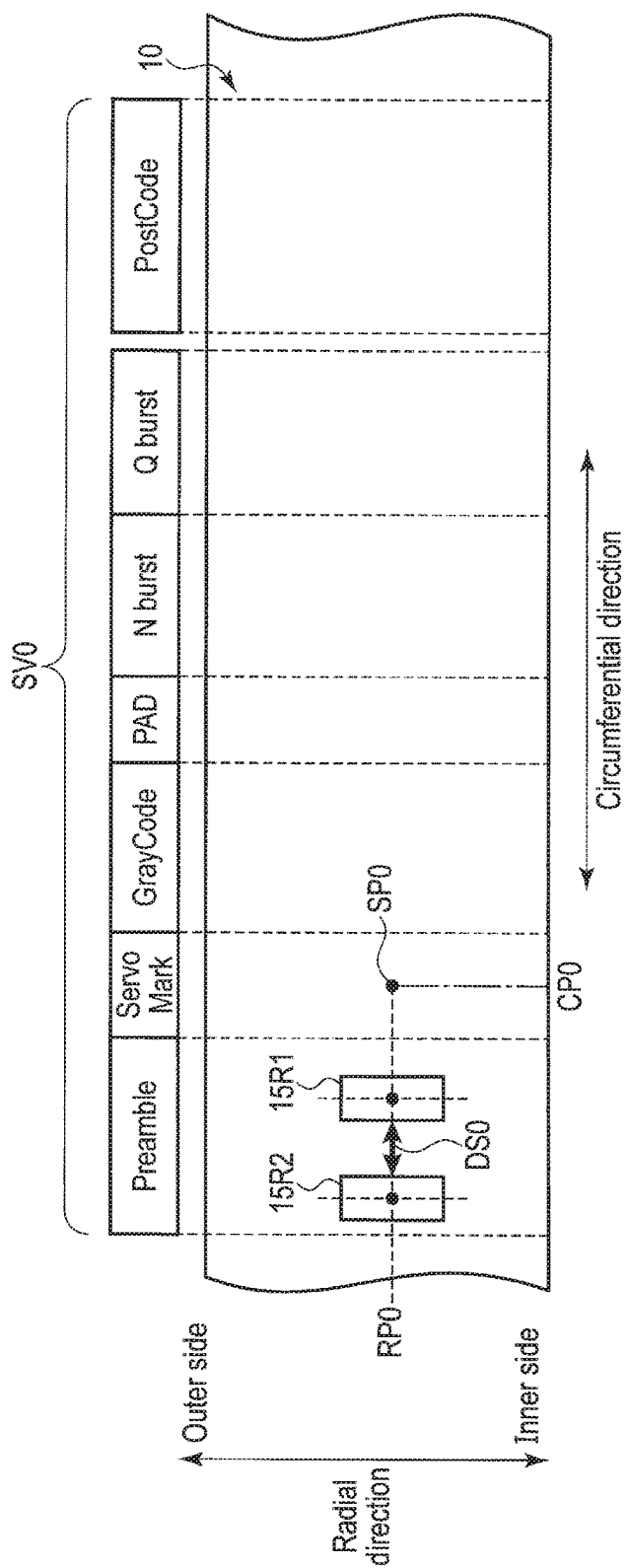
F I G. 9

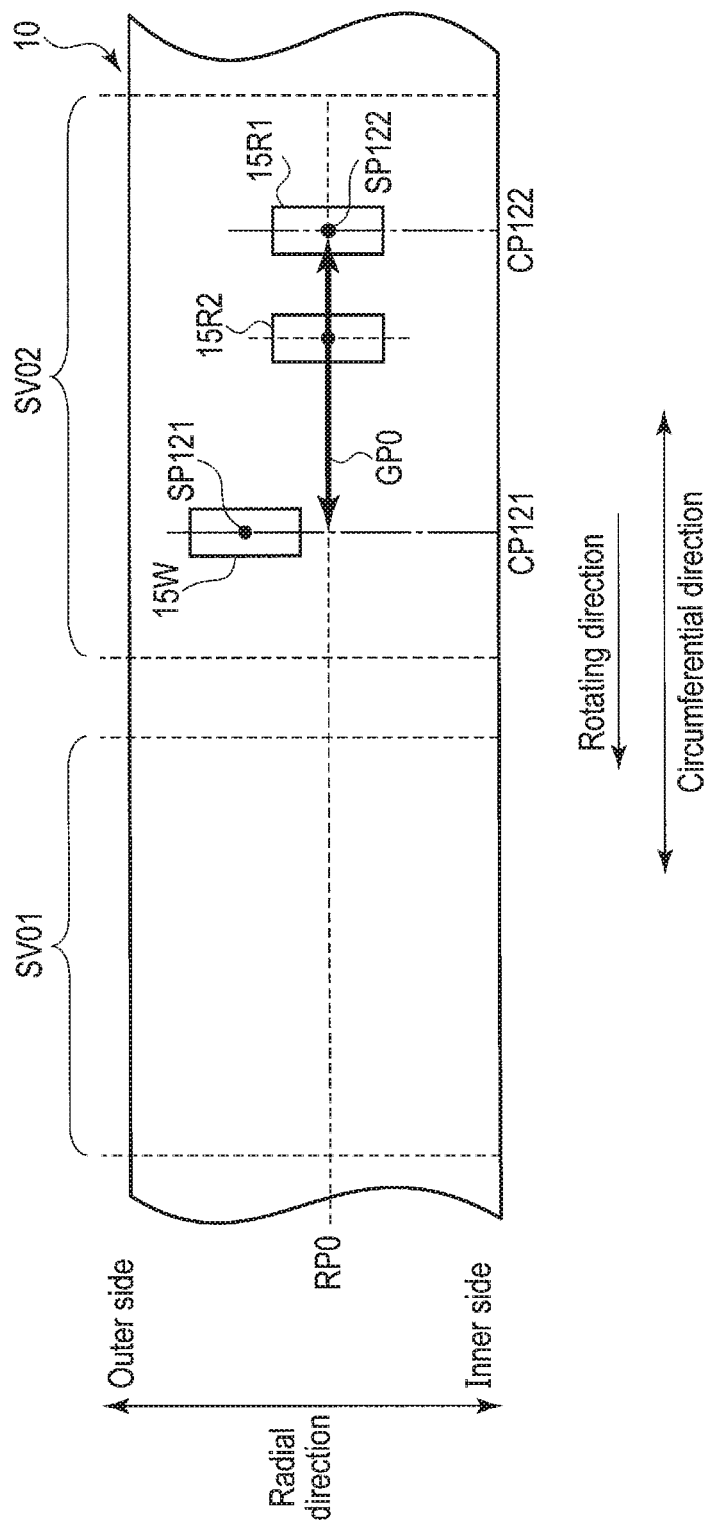
F I G. 12

METHOD FOR CORRECTING POSITION OFFSET OF THE HEADS ON TWO DIMENSIONAL MAGNETIC RECORDING DEVICE

CROSS-REFERENCE TO RELATED APPLICATIONS

This application is based upon and claims the benefit of priority from Japanese Patent Application No. 2017-249831, filed Dec. 26, 2017, the entire contents of which are incorporated herein by reference.

FIELD

Embodiments described herein relate generally to a magnetic disk device and a read/write offset correction methods.

BACKGROUND

In recent years, magnetic disk devices based on Two-Dimensional Magnetic Recording (TDMR) and comprising a plurality of read heads have been developed. In TDMR, a read/write (R/W) offset may occur between a write head and the plurality of read heads. Thus, in a TDMR magnetic disk device, if data is read which is written to a position separated, by an R/W offset, from a position with the read head positioned thereat, the position of a reference read head which is to read data is corrected based on the R/W offset between the write head and the reference read head. To correct the position of the reference read head in this manner, the TDMR magnetic disk device measures, at a prescribed track of the disk, the R/W offset between the write head and each of the plurality of read heads, and holds the measured R/W offsets in a nonvolatile memory or the like. Furthermore, an increased track density (Track Per Inch: TPI) has led to the need to measure the R/W offset at more tracks and hold the measured R/W offsets in order to improve measurement accuracy of an R/W offset correction value. Therefore, this may increase the time taken to measure the R/W offset correction value for each head and a data capacity for holding the measured R/W offsets.

BRIEF DESCRIPTION OF THE DRAWINGS

FIG. 1 is a block diagram illustrating a configuration of a magnetic disk device according to a first embodiment.

FIG. 3B is a diagram illustrating an example of geometric placement of the write head and the two read heads in a case where one of the read heads is placed at the radial position illustrated in FIG. 2.

FIG. 4 is a block diagram illustrating a configuration example of an R/W channel and an MPU according to the first embodiment.

FIG. 5 is a schematic diagram illustrating an example of a detection method for a lateral deviation (CTS).

FIG. 9 is a schematic diagram illustrating an example of a measurement method for a reference down track separation.

FIG. 12 is a schematic diagram illustrating an example of a measurement method for a reference gap.

Figure 2:
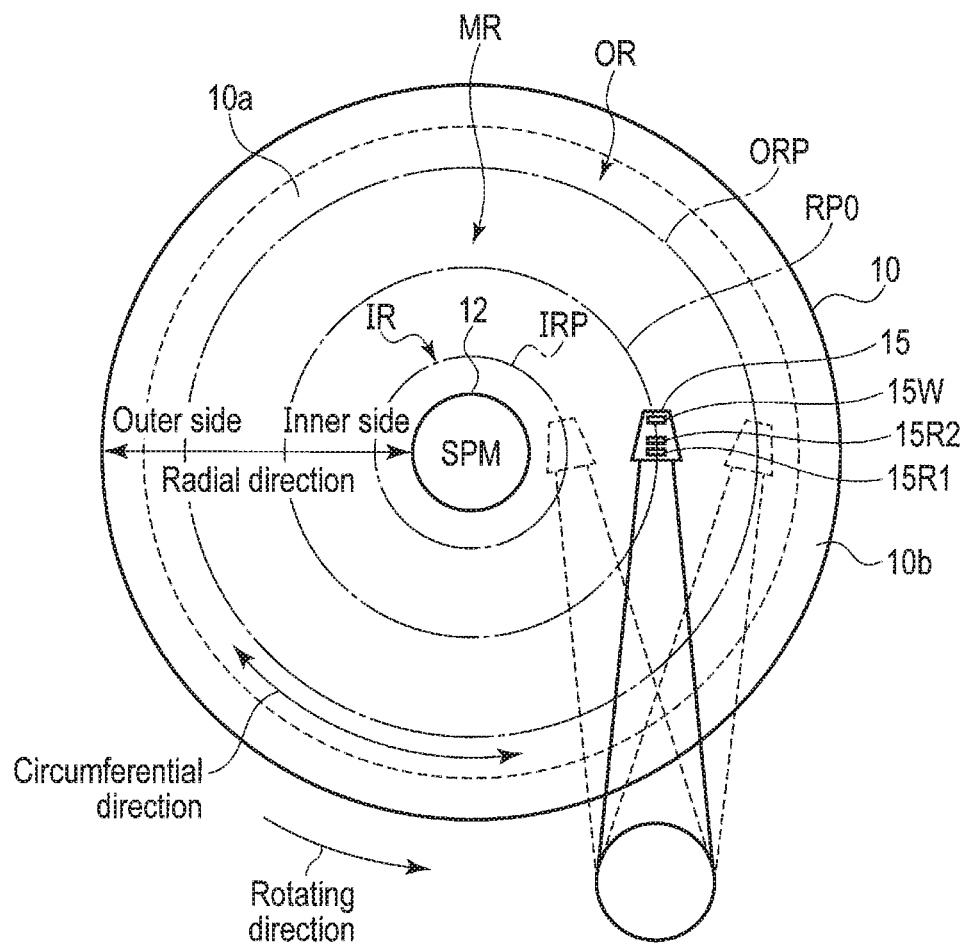
FIG. 2 is a schematic diagram illustrating an example of placement of heads with respect to a disk according to the first embodiment.

DETAILED DESCRIPTION in general, according to one embodiment, a magnetic disk device comprises: a disk; a head comprising a write head configured to write data to the disk and a first read head and a second read head configured to read data from the disk; and a controller configured to generate a correction value based on placement information on the write head and the first read head and the second read head in a case where the first read head and the second read head are placed in tandem along a second direction orthogonal to a first direction coinciding with a radial direction of the disk, a first distance between the first read head and the second read head in the first direction in a case where the first read head is placed at a first position of the disk, and a second distance between the first read head and the second read head in the second direction in a case where the first read head is placed at the first position of the disk, and to correct positions of the heads based on the correction value in a case where first data written with the first read head placed at the first position is read.

According to another embodiment, a read/write offset correction method applied to a magnetic disk device comprising a disk, a head comprising a write head configured to write data to the disk and a first read head and a second read head configured to read data from the disk, the method comprising: generating a correction value based on placement information on the write head and the first read head and the second read head in a case where the first read head and the second read head are placed in tandem along a second direction orthogonal to a first direction coinciding with a radial direction of the disk, a first distance between the first read head and the second read head in the first direction in a case where the first read head is placed at a first position of the disk, and a second distance between the first read head and the second read head in the second direction in a case where the first read head is placed at the first position of the disk; and correcting positions of the heads based on the correction value in a case where first data written with the first read head placed at the first position is read.

Embodiments will be described below with reference to the drawings. The drawings are illustrative and are not intended to limit the scope of the invention.

First Embodiment

FIG. 1 is a block diagram illustrating a configuration of a magnetic disk device 1 according to a first embodiment.

The magnetic disk device 1 comprises a head disk assembly (HDA) described below, a driver IC 20, a head amplifier integrated circuit (hereinafter referred to as the head amplifier IC or preamplifier) 30, a volatile memory 70, a buffer memory (buffer) 80, a nonvolatile memory 90, and a system controller 130 that is a one-chip integrated circuit. The magnetic disk device 1 is also connected to a host system (host) 100. The magnetic disk device 1 is, for example, a Two-Dimensional Magnetic Recording (TDMR) magnetic disk device.

The FDA comprises a magnetic disk (hereinafter referred to as the disk) 10, a spindle motor (SPM) 12, an arm 13 equipped with a head 15, and a voice coil motor (VCM) 14. The disk 10 is attached to the spindle motor 12 and is driven and rotated by the spindle motor 12. The arm 13 and the VCM 14 constitute an actuator. The actuator is driven by the VCM 14 to controllably move the head 15, mounted on the arm 13, to a target position on the disk 10. Two or more disks 10 and two or more heads 15 may be provided.

The disk 10 comprises reserved recording areas including a recording area 10a available to a user and a system area 10b to which information needed for system management is written. A direction along a circumference of the disk 10 is hereinafter referred to as the circumferential position, and a direction orthogonal to the circumferential position is hereinafter referred to as the radial direction.

The head 15 comprises a slider as a main body, and write head 15W and read heads 15R1 and 15R2 mounted on the slider. The read heads 15R1 and 15R2 read data recorded in data tracks on the disk 10. The read head 15R1 is provided, for example, at the farthest position from the write head 15W. The read head 15R2 is provided, for example, at the second farthest positron from the write head 15W after the read head 15R1. Three or more read heads may be provided. For convenience of description, data written to a track of the disk 10 may simply be referred to as the track.

FIG. 2 is a schematic diagram illustrating an example of placement of the head 15 with respect to the disk 10 according to the first embodiment. In FIG. 2, in the radial direction, a direction toward an outer circumference of the disk 1 is referred to as an outer side, and a direction opposite to the outer side is referred to as an inner side. FIG. 2 also illustrates a rotating direction of the disk 10. Alternatively, the disk 10 may rotate in the opposite rotating direction. In the description below, the magnetic disk device 1 is assumed to place the head 15 at a prescribed position or a prescribed track (hereinafter simply referred to as "position the head 15") with the read head 15R1 defined as a reference. Alternatively, the magnetic disk device 1 may position the head 15 with a read head other than the read head 15R1, for example, the read head 15R2 defined as a reference.

In the example illustrated in FIG. 2, the recording area 10a is divided into an inner circumferential area IR positioned on the inner side, an outer circumferential area OR positioned on the outer side, and a middle circumferential area MR positioned between the inner circumferential area IR and the outer circumferential area OR. FIG. 2 illustrates a position in the radial direction (hereinafter referred to as the radial position) IRP, a radial position RP0, and a radial position ORP. The radial position IRP is a position located on the inner side of the radial position RP0, and the radial position ORP is a position located on the outer side of the radial position RP0. In the example illustrated in FIG. 2, the radial position RP0 is located in the middle circumferential area MR. The radial position RP0 may be located in the outer circumferential area OR or in the inner circumferential area IR. If a central portion of the read head 15R1 is located at the radial position RP0, a skew angle between the read head 15R1 and the read head 15R2 (hereinafter referred to as the skew angle) is, for example, 0 degrees. In this case, the central portion of the read head 15R1 and a central portion of the read head 15R2 are assumed to lie at the same radial position. In other words, the central portions of the read head 15R1 and the read head 15R2 are located, at the radial position RP0, on a straight line parallel to the circumferential direction. The radial position RP0 is hereinafter referred to as the reference position RP0. If the central portion of the read head 15R1 is located at the radial position RP0, the central portions of the read head 15R1 and the read head 15R2 may be slightly displaced from each other in the radial direction. For convenience of description, the "central portion of the read head (write head)" may simply be represented as the "read head (write head)". If the read head 15R1 is placed at the radial position ORP, the skew angle has, for example, a positive value. If the read head 15R2 is placed at the radial position ORP, the skew angle has, for example, a negative value. Additionally, if the read head 15R1 is placed at the radial position RP0, the angle of the write head 15W with respect to a straight line passing through the read heads 15R1 and 15R2 may have a value other than 0 degrees. If the read head 15R1 is placed at the radial position ORP, the skew angle may have a negative value. If the read head 15R1 is placed at the radial position IRP, the skew angle may have a positive value.

Figure 3A:
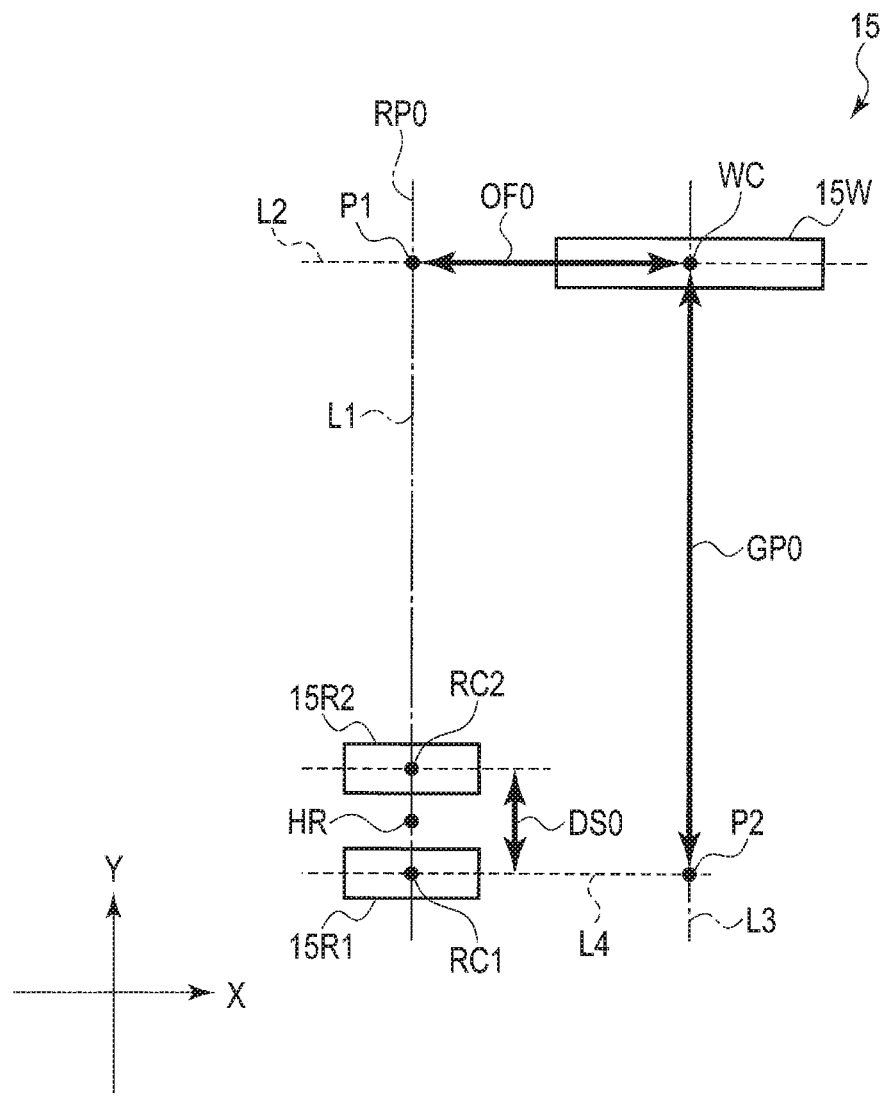
FIG. 3A is a diagram illustrating an example of geometric placement of a write head and two read heads in a case where one of the read heads is placed at a reference position illustrated in FIG. 2.

FIG. 3A is a diagram illustrating an example of a geometric placement of the write head 15W and the two read heads 15R1 and 15R2 in a case where the read head 15R1 is placed at the reference position RP0 illustrated in FIG. 2. In FIG. 3A, the radial direction at the position of the read head 15R1 is referred to as a first direction X, and a direction orthogonal to the first direction N is referred to as a second direction Y. Now, the geometric placement, in an X-Y plane, of the write head 15W and the two read heads 15R1 and 15R2, included in the head 15, will be described; the position of the read head 15R1 is defined as a reference. The second direction Y corresponds to the circumferential direction at the position of the read head 15R1. Furthermore, a direction in which the tip of the arrow of the first direction X faces corresponds to the outer side (with respect to the read head 15R1), and the opposite direction corresponds to the inner side (with respect to the read head 15R1). A direction in which the tip of the arrow of the second direction Y faces is referred to as a front side (or front), and a direction opposite to the front side is referred to as a back side (or back). In the first direction X, the outer side is assumed to be positive, and the inner side is assumed to be negative. In the second direction Y, the front side may be assumed to be positive, and the back side may be assumed to be negative. Alternatively, in the first direction X, the outer side may be assumed to be negative, and the inner side may be assumed to positive. Alternatively, in the second direction Y, the front side may be assumed to be negative, and the back side may be assumed to be positive.

FIG. 3A illustrates a central portion WC of the write head 15W, a central portion RC1 of the read head 15R1, and a central portion RC2 of the read head 15R2. FIG. 3A illustrates an intermediate portion HR between the central portion RC1 of the read head 15R1 and the central portion RC2 of the read head 15R2. FIG. 3A illustrates a straight line L1 passing through the central portion RC1 of the read head 15R1 and the central portion. RC2 of the read head 15R2, a straight line L2 which is orthogonal to the straight line L1 and which passes through the central portion WC of the write head 15W, a straight line L3 which is parallel to the straight line L1 and which passes through the central portion WC, and a straight line L4 which is parallel to the straight line 12 and which passes through the central portion RC1. FIG. 3A also illustrates an intersection point P1 between the straight lines L1 and L2 and an intersection point P2 between the straight lines L3 and L4. A read/write (R/W) offset hereinafter refers to a distance in the first direction X between the write head and a portion serving as a reference (hereinafter referred to as the reference portion) in a case where target data of the data written to the disk 10 (hereinafter referred to as the target data or target track) is read. The reference portion is, for example, the central portion RC1 of the read head 15R1, the central portion RC2 of the read head 15R2, and the intermediate portion HR between the read head 15R1 and the read head 15R2. The R/W offset may be referred to as an MR offset, a core offset, or the like. Furthermore, a distance between the write head 15W and the reference portion in the second direction Y is referred to as a read/write (R/W) gap. A distance between the central portion RC1 of the read head 15R1 and the central portion RC2 of the read head 15R2 in the second direction Y is referred to as a Down Track Separation (DTS), which is referred to as a longitudinal deviation for convenience of description.

In the example illustrated in FIG. 3A, if the read head 15R1 is placed at the reference position RP0, the write head 15W is positioned on the outer side of the read head 15R1 in the first direction X at a distance equal to an R/W offset OF0 from the read head 15R1. The write head 15W is positioned on the front side of the read head 15R1 in the second direction Y at a distance equal to an R/W gap GP0 from the read head 15R1. The R/W offset OF0 is hereinafter referred to as the reference offset OF0. The reference offset OF0 may result from, for example, variation during a manufacturing process. The reference offset OF0 may be 0 (zero) or a value for an offset toward the inner side. The reference offset OF0 is, for example, of the order of several hundred [nm (nanometers)]. The R/W gap GP0 is referred to as the reference gap GP0. The R/W gap GP0 is, for example, of the order of several thousand [nm].

In the example illustrated in FIG. 3A, if the read head 15R1 is placed at the reference position RP0, the read head 15R2 is also placed at the reference position RP0. In other words, if the read head 15R1 is placed at the reference position RP0, the read head 15R1 and the read head 15R2 are placed in tandem along the second direction. Thus, the read head 15R2 is spaced from the write head 15W by the reference offset OF0 in the first direction X. In the example illustrated in FIG. 3A, the read head 15R2 is positioned on the front side of the read head 15R1 at a distance equal to a longitudinal deviation DS0 from the read head 15R1. The longitudinal deviation DS0 is hereinafter referred to as the reference longitudinal deviation DS0. The reference longitudinal deviation DS0 is, for example, of the order of several ten [nm].

In the example illustrated in FIG. 3A, if the read head 15R1 is placed at the reference position RP0, the intermediate portion HR is also placed at the reference position RP0. Thus, the intermediate portion HR is spaced from the write head 15W by the R/W offset OF0 in the first direction X.

While maintaining the geometric placement of the write head 15W and the two read head 15R1 and 15R2 illustrated in FIG. 3A, the head 15 is driven and moved to a target position by the actuator while being skewed at a prescribed skew angle.

FIG. 3B is a diagram illustrating an example of a geometric placement of the write head 15W and the two read heads 15R1 and 15R2 in a case where the read head 15R1 is placed at the reference position ORP illustrated in FIG. 2. A distance in the first direction X between the central portion RC1 of the read head 15R1 and the central portion RC2 of the read head 15R2 is referred to as a Cross Track Separation (CTS), which will be referred to as a lateral deviation for convenience of description. In FIG. 3B, the head 15 is skewed at a skew angle θ toward the outer side. In FIG. 3S, the skew angle θ has, for example, a positive value.

In the example illustrated in FIG. 35, if the read head 15R1 is placed at the radial position ORP, the write head 15W is positioned on the outer side of the read head 15R1 in the first direction X at a distance equal to an R/W offset OF1 from the read head 15R1. The write head 15W is positioned on the front side of the read head 15R1 in the second direction Y at a distance equal to an R/W gap GP1 from the read head 15R1.

Based on the example illustrated in FIG. 35, the R/W offset OF1 is represented by the following equation.

$$OF1 = OD1 + OD2 \qquad \text{Equation (1)}$$

Here, OD1 denotes a distance between the intersection point P1 and the central portion RC1 the first direction X, and OD2 denotes a distance between the intersection point P1 and the central portion WC in the first direction X. In the example illustrated in FIG. 35, based on a similarity relationship, the distances OD1 and OD2 are represented by the following equations.

$$OD1 = GP0 \times CS/DS0 \qquad \text{Equation (2)}$$

$$OD2 = OF0 \times DS/DS0 \qquad \text{Equation (3)}$$

Here, CS denotes a distance between the central portion RC1 and the central portion RC2 in the first direction X, and DS denotes a distance between the central portion RC1 and the central portion RC2 in the second direction Y. In the example illustrated in FIG. 3B, the lateral deviation CS and the longitudinal deviation DS have, for example, positive values.

In accordance with Equations (1) to (3) described above, the R/W offset OF1 is represented by the following equation.

$$OF1 = GP0 \times CS/DS0 + OF0 \times DS/DS0 \qquad \text{Equation (4)}$$

As described above, the R/W offset OF1 can be calculated in accordance with Equation (4) using the reference offset OF0, the reference longitudinal deviation DS0, the reference gap GP0, the lateral deviation CS, and the longitudinal deviation DS. Furthermore, also if the read head 15R1 placed at the position IRP illustrated in FIG. 2, the R/W offset. OF1 can be calculated in accordance with Equation (4).

In the example illustrated in FIG. 3B, if the read head 15R1 is placed at the radial position ORP, the write head 15W is positioned on the outer side of the read head 15R2 in the first direction X at a distance equal to an R/W offset OF2.

Based on the example illustrated in FIG. 3B, the R/W offset OF2 is represented by the following equation.

$$OF2 = OF1 - CS \qquad \text{Equation (5)}$$

As described above, the R/W offset OF2 can be calculated in accordance with Equation (5) using the R/W offset OF1 and the lateral deviation CS.

In the example illustrated in FIG. 3B, if the read head 15R1 is placed at the radial position ORP, the write head 15W is positioned on the outer side of the intermediate portion HR in the first direction X at a distance equal to an R/W offset OF3 from the intermediate portion HR.

Based on the example illustrated in FIG. 3B, the R/W offset OF3 is represented by the following equation.

$$OF3 = OF1 - CS/2 \qquad \text{Equation (6)}$$

As described above, the R/W offset OF3 can be calculated in accordance with Equation (6) using the R/W offset OF1 and CS/2.

The driver IC 20 controllably drives the SPM 12 and the VCM 14 under the control of a system controller 130 (specifically, an MPU 60 described below).

The head amplifier IC (preamplifier) 30 comprises a read amplifier and a write driver. The read amplifier amplifies a read signal read from the disk 10 and outputs the amplified read signal to the system controller 130 (specifically, a read/write (R/W) channel 50). The write driver outputs, to the head 15, a write current corresponding to write data output from the R/W channel 50.

The volatile memory 70 is a semiconductor memory from which saved data is lost if power supply is disrupted. The volatile memory 70 stores, for example, data needed for processing in each unit of the magnetic disk device 1. The volatile memory 70 is, for example, a Dynamic Random Access Memory (DRAM) or a Synchronous Dynamic Random Access Memory (SDRAM).

The buffer memory 80 is a semiconductor memory in which, for example, data transmitted and received between the magnetic disk device 1 and the host 100 is temporarily recorded. The buffer memory 80 may be configured integrally with the volatile memory 70. The 30 buffer memory 80 is, for example, a DRAM, a Static Random Access Memory (SRAM), an SDRAM, a Ferroelectric Random Access Memory (FeRAM), or a Magnetoresistive Random Access Memory.

The nonvolatile memory 90 is a semiconductor memory in which saved data is recorded even if power supply is disrupted. The nonvolatile memory 90 is, for example, a NOR or NAND flash ROM (Flash Read Only Memory: FROM).

The system controller controller) 130 is implemented using, for example, a large-scale integrated circuit (LSI) referred to as a System-on-a-Chip (SoC) and comprising a plurality of elements integrated together on a single chip. The system controller 130 includes a hard disk controller (HDC) 40, the read/write (F/N) channel 50, and the microprocessor (MPU) 60. The HDC 40, the R/W channel 50, and the MPU 60 are electrically connected together. The system controller 130 is electrically connected to the driver IC 20, the head amplifier IC 30, the volatile memory 70, the buffer memory 80, the nonvolatile memory 90, and the host system 100.

The HDC 40 controls data transfer between the host 100 and the R/W channel 50 in accordance with instructions from the MPU 60 described below. The HDC 40 is electrically connected to the volatile memory 70, the buffer memory 80, and the nonvolatile memory 90.

The R/W channel 50 executes signal processing on read data and write data in accordance with instructions from the MPU 60. The R/W channel 50 has a circuit or a function to measure signal quality of data. The R/W channel 50 is electrically connected to the head amplifier IC 30.

The MPU 60 is a main controller which controls each unit of the magnetic disk device 1. The MPU 60 performs servo control to control the VCM 14 via the driver IC 20 to position the head 15. The MPU 60 controls a write operation for writing data to the disk 10, and selects a saying destination for write data transferred from the host 100. The MPU 60 also controls a read operation for reading data from the disk 10, and controllably processes read data transferred from the disk 10 to the host 100. The MPU 60 is connected to each unit of the magnetic disk device 1. For example, the MPU 60 is electrically connected to the driver IC 20, the HDC 40, and the R/W channel 50.

FIG. 4 is a block diagram illustrating an example of a configuration of the R/W channel 50 and the MPU 60 according to the present embodiment. In FIG. 4, the disk 10, the head 15, the driver IC 20, and the like are omitted.

The R/W channel 50 comprises a first demodulator 510 and a second demodulator 520. For example, the first demodulator 510 demodulates data read by the read head 15R1, for example, a servo signal, and outputs the demodulated servo data to the MPG 60 or the like. Like the first demodulator 510, the second demodulator 520 demodulates a servo signal read by the read head 15R2, and outputs the demodulated servo data to the MPU 60 or the like. For three or more read heads, the R/W channel 50 may comprise three or more demodulators. In this case, the plurality of demodulators correspond to the respective read heads.

The MPU 60 comprises a read/write controller 610, a position detector 620, and a generation unit 630. The MPU 60 causes these units, for example, the read/write controller 610, the position detector 620, and the generation unit 630 to execute respective types of processing on firmware. The MPG 60 may comprise these units as a circuit.

The read/write controller 610 controls data read processing and write processing in accordance with commands from the host 100. The read/write controller 610 controls the VCM 14 via the driver IC 20, places the head 15 at a target position on the disk 10, and executes read processing or write processing. The read/write controller 610 uses one of the read heads 15R1 and 15R2 to execute read processing. Alternatively, the read/write controller 610 uses both the read heads 15R1 and 15R2 to execute read processing. The read/write controller 610 outputs, to the generation unit 630, signals corresponding to a read method, a write method, characteristics of target data (or target track), and the like. If the target data is to be written or read, the read/write controller 610 acquires an R/W offset correction value (hereinafter simply referred to as the correction value) from the generation unit 630, and performs offset correction on the head 15 based on the correction value. For convenience of description, a central position of the target data (or target track) in the radial direction is hereinafter sometimes simply referred to as the target data (or target track). Furthermore, offset correction may simply be referred as correction. For example, if the target data is to be read by the read head 15R1, the read/write controller 610 corrects the position of the read head 1581 on the disk 10 based on the correction value, places the read head 15R1 on the target data, and reads the target data. If the target data is to be read by the read head 15R2, the read/write controller 610 corrects the position of the read head 15R2 on the disk 10 based on the correction value, places the read head 15R2 on the target data, and reads the target data. If the target data is to be read by the read heads 15R1 and 15R2, the read/write controller 610 corrects the position of the intermediate portion HR on the disk 10 based on the correction value, places the intermediate portion HR on the target data, and reads the target data. The read/write controller 610 may execute write processing by a normal recording method or by shingled magnetic recording in which a track is written in such a manner as to overlap a portion of the last written track. Furthermore, as described below, the read/write controller 610 may adjust, before write, the position of the write head 15W to allow data to be written to the same track position in spite of a change in temperature.

The position detector 620 detects and measures parameters associated with the positions of the write head 15W, the read head 15R1, the read head 15R2, and the like (hereinafter referred to as the parameters). For example, the position detector 620 causes the read/write controller 610 to control the head 15 to detect and measure, as the parameters, the lateral deviation CS, the longitudinal deviation DS, the reference longitudinal deviation DS0, the reference offset OF0, and the reference gap GP0.

The position detector 620 measures geometric placement information (the reference longitudinal deviation DS0, the reference offset OF0, and the reference gap GP0) (hereinafter simply referred to as the reference placement information) included in the above-described parameters and serving as references for the write head 15W and the two read heads 15R1 and 15R2, associates the measured reference placement information with the head 15 in a table TB, and records the table TB in the nonvolatile memory 90, the system area 10b, or the like. The position detector 620, for example, pre-measures the reference placement information during a manufacturing process or the like, associates the measured reference placement information with the head 15 in the table TB, and records the table TB in the nonvolatile memory 90, the system area 10b, or the like. For a plurality of the heads 15, the position detector 620 measures the reference placement information for each head 15, associates the measured plurality of sets of pieces of reference placement information (a plurality of reference longitudinal deviations DS0, a plurality of reference offsets OF0, and a plurality of reference gaps GP0) with the respective heads 15 in the table TB, and records the table TB in the nonvolatile memory 90, the system area 10b, or the like.

The position detector 620 also detects the lateral deviation CS and the longitudinal deviation CS based on the positions of the read heads 15R1 and 15R2 on the disk 10. For example, to read the target data, the position detector 620 detects the lateral deviation CS and the longitudinal deviation DS. The lateral deviation CS and the longitudinal deviation DS can be calculated from the servo data demodulated by the R/W Channel 50.

FIG. 5 is a schematic diagram illustrating an example of a detection method for the lateral deviation CS (CTS). FIG. 5 illustrates a servo sector SV in a prescribed area of the disk 10 and the read heads 15R1 and 15R2 positioned in a prescribed area.

In the example illustrated in FIG. 5, the servo sector SV includes a preamble area, a servo mark area, a gray code area, a PAD area, an N burst area, a Q burst area, and a post code area. The preamble area is an area containing preamble information for synchronization with a reproduction signal for a servo pattern. The servo mark area is an area containing servo mark information indicative of the beginning of the servo pattern. The gray code area is an area containing gray code information indicative of a servo sector number, a track (cylinder) number, or the like. The PAD area is an area containing PAD information for a synchronization signal such as for gap and servo AGC. The N burst area and the Q burst area are areas containing burst information indicative of the relative position of the head 15 with respect to a track. The post code area is an area containing post code information used to adjust position disturbance RRO (Repeatable RunOut) which synchronizes with rotation. The post code area may not be included in the servo sector SV.

In the example illustrated in FIG. 5, the position detector 620 causes the first demodulator 510 to demodulate a gray code, an N burst, a Q burst, and a post code following, in the circumferential direction, servo mark information read by the read head 15R1 at the position SP1 of the servo mark area (hereinafter referred to as the servo mark position), and detects a radial position RPR1 of the read head 15R1 as a servo demodulation position. The position detector 620 causes the second demodulator 520 to demodulate a gray code, an N burst, a Q burst, and a post code following, in the circumferential direction, servo mark information read by the read head 15R2 at a servo mark position S32, and detects a radial position RPR2 of the read head 15R2 as a servo demodulation position. In the example illustrated in FIG. 5, the servo mark position SP1 and the servo mark position SP2 are located at the same position CP in the circumferential direction (hereinafter referred to as the circumferential position CP). The servo mark position. SP1 and the servo mark position SP2 may be displaced from each other in the circumferential direction. Using the radial position RPR1 and the radial position RPR2, the lateral deviation CS is represented by the following equation.

$$CS = RPR2 - RPR1 \qquad \text{Equation (7)}$$

The position detector 620 generates a lateral deviation CS in accordance with Equation (7) using the radial positions RPR1 and RPR2 detected as servo demodulation positions. In order to improve the accuracy of the lateral deviation CS, the position detector 620 may generate a plurality of lateral deviations and acquire the average value of the plurality of lateral deviations as the lateral deviation CS. For example, the position detector 620 positions the head 15 at a prescribed track, generates a plurality of lateral deviations for servo sectors corresponding to one round of the track, and acquires the average value of the plurality of lateral deviations as the lateral deviation CS. Alternatively, the position detector 620 may detect the radial positions RPR1 and RPR2 based on radial position information (data) on the two read heads 15R1 and 15R2 in an area other than the servo sector instead of the servo demodulation position in the servo sector SV.

Figure 6:
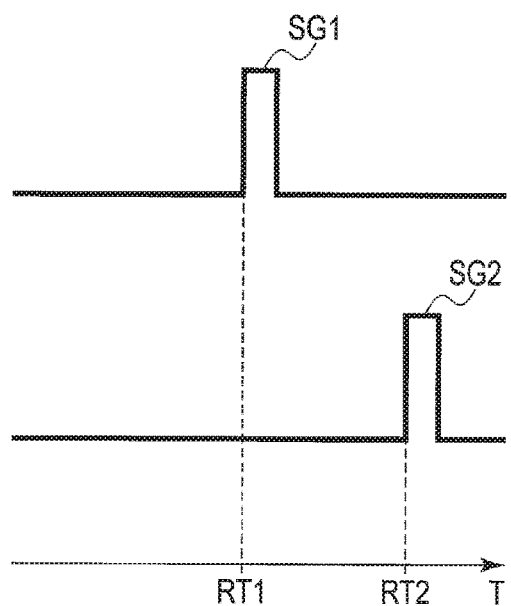
FIG. 6 is a schematic diagram illustrating an example of a detection method for a longitudinal deviation (DTS).

FIG. 6 is a schematic diagram illustrating an example of a detection method for the longitudinal deviation DS (DTS). In FIG. 6, the abscissa axis indicates time. In FIG. 6, a detection signal SG1 is, for example, a signal indicating that the read head 15R1 has detected servo mark information at the servo mark position SP1 illustrated in FIG. 5, and a detection signal SG2 is, for example, a signal indicating that the read head 15R2 has detected servo mark information at the servo mark position SP2 illustrated in FIG. 5. A timing RT1 indicates a timing corresponding to detection of the servo mark information at the servo mark position SP1 by the read head 15R1, and a timing RT2 indicates a timing corresponding to detection of the servo mark information at the servo mark position SP2 by the read head 15R2. The detection signals SG1 and SG2 may be signals indicating detection of the information of an area in the servo sector SV other than the servo mark area.

In the example illustrated in FIG. 6, the position detector 620 detects a timing RT1 of a rising edge of the detection signal SG1. The position detector 620 detects a timing RT2 of a rising edge of the detection signal SG2. Using the timings RT1 and RT2, the longitudinal deviation DS is represented by the following equation.

$$DS = V \times (RT2 - RT1) \quad \text{Equation (8)}$$

Here, V denotes a linear velocity (rotation speed) of the disk 10.

The position detector 620 generates a longitudinal deviation DS in accordance with Equation (8) using the detected timings RT1 and RT2 and the linear velocity V. In order to improve the accuracy of the longitudinal deviation DS, the position detector 620 may generate a plurality of down track separations and acquire the average of the plurality of down track separations as the longitudinal deviation DS. For example, the position detector 620 positions the head at a prescribed track, generates a plurality of down track separations for servo sectors corresponding to one round of the track, and acquires the average of the plurality of down track separations as the longitudinal deviation DS.

Now, with reference to FIG. 7 to FIG. 13, an example of a measurement method for the reference placement information will be described.

To measure the reference placement information, the position detector 620 sets a position with a lateral deviation CS of 0 (or a value close to 0), that is, the reference position RP0. To set the reference position RP0, the position detector 620 positions the head 15 at a prescribed track (or a prescribed radial position), measures the radial positions RPR1 and RPR2, and generates a lateral deviation CS in accordance with Equation (5) using the measured radial positions RPR1 and RPR2. For example, the position detector 620 positions the head 15 at a plurality of tracks from the outer side toward the inner side of the disk 10, pre-measures, during the manufacturing process or the like, the radial positions RPR1 and RPR2 at each of the plurality of tracks with the head 15 positioned thereat, and pre-generates, during the manufacturing process or the like, a plurality of lateral deviations CS at the respective tracks with the head 15 positioned thereat. Alternatively, the position detector 620 may measure the radial positions RPR1 and RPR2 at each of a plurality of tracks from the inner side toward the outer side of the disk 10. The position detector 620, for example, detects, among the generated plurality of lateral deviations CS, two consecutive lateral deviations CS respectively having a negative value and a positive value. Alternatively, the position detector 620 may detect two lateral deviations CS with different decrease and increase tendencies among the generated plurality of lateral deviations CS.

For example, if two consecutive lateral deviations CS respectively having a negative value and a positive value are designated by CS1 and CS2 and the radial positions RP1 and RP2 respectively correspond to the lateral deviations CS1 and CS2, an estimated value RP0e of the reference position RP0 is represented by the following equation.

$$RP0e = (RP1 \times CS2 \times RP2 \times CS1)/(CS2 - CS1) \quad \text{Equation (9)}$$

The position detector 620 generates an estimated value RP0e in accordance with Equation (9) using the two lateral deviations CS and the two radial positions RP1 and RP2 respectively corresponding to the lateral deviations CS1 and CS2. The position detector 620 sets the generated estimated value RP0e as the reference position RP0. The position detector 620 associates, with the head 15 in the table TB, the lateral deviation CS measured to set the reference position RP0 and the position information on the track for which the lateral deviation CS has been measured (hereinafter referred to as the measured track position information), and records the table TB in the nonvolatile memory 90, the system area 10b, or the like. For a plurality of the heads 15, the position detector 620 sets a plurality of reference positions RP0 corresponding to the respective heads. The position detector 620 associates, with the plurality of heads 15 in the table TB, the corresponding measured lateral deviations CS of the plurality of heads and the measured track position information, and records the table TB in the nonvolatile memory 90, the system area 10b, or the like.

Figure 7:
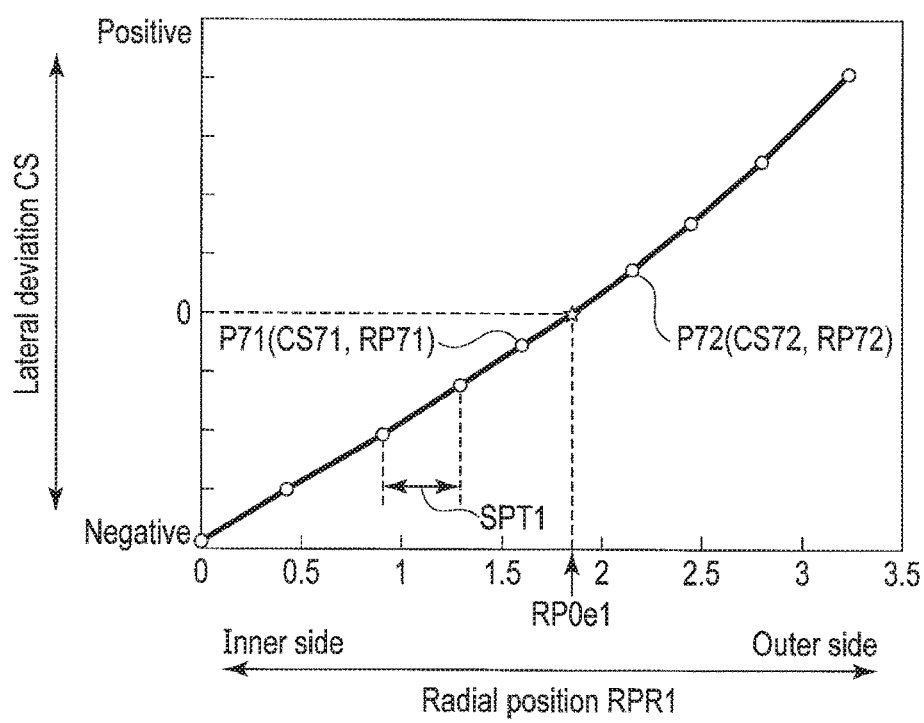
FIG. 7 is a schematic diagram illustrating an example of a setting method for a reference position.
Figure 8:
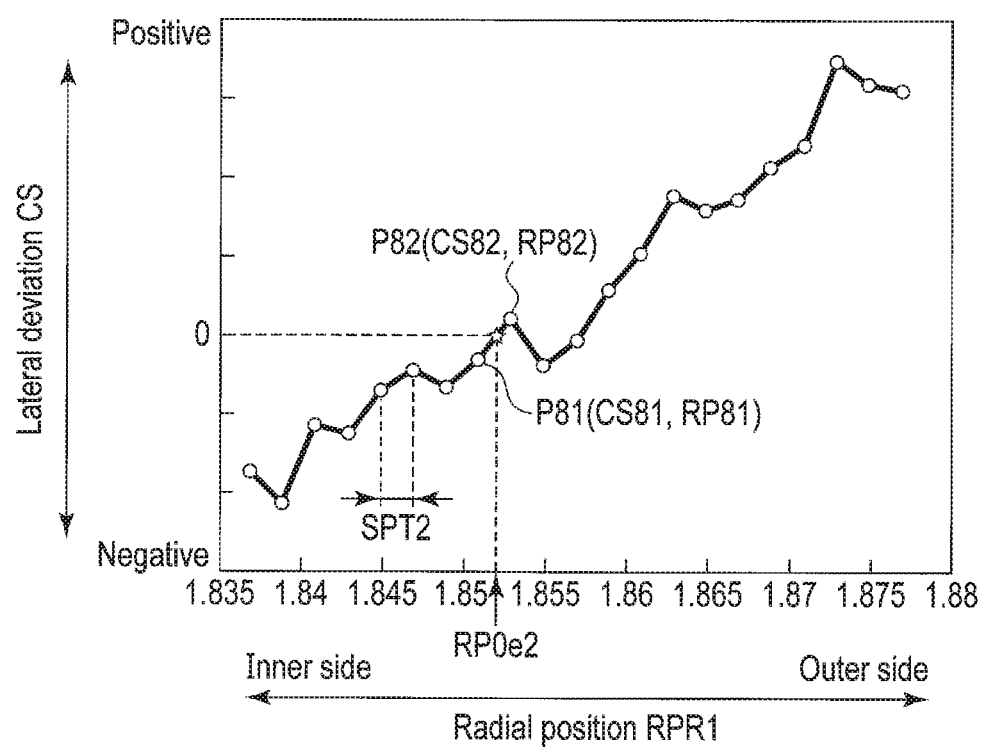
FIG. 8 is a schematic diagram illustrating an example of the setting method for the reference position.

FIG. 7 and FIG. 6 are schematic diagrams illustrating an example of a setting method for the reference position R. In FIG. 7 and FIG. 8, the ordinate axis indicates the lateral deviation CS, and the abscissa axis indicates the radial position RPR1 of the read head 15R1. Furthermore, a plurality of points in FIG. 7 and FIG. 8 indicate measured lateral deviations CS. In FIG. 7, a point P71 indicates a lateral deviation CS71 measured in a case where the read head 15R1 is placed at a radial position R271. A point P72 indicates a lateral deviation CS72 measured in a case where the read head 15R1 is placed at a radial position RP72. In FIG. 7, the points P71 and P72 are indicative of consecutively measured values. In FIG. 7, CS71<0 and CS72>0. In FIG. 8, a point P81 indicates a lateral deviation CS81 measured in a case where the read head 15R1 is placed at a radial position RP81. A point P82 indicates a lateral deviation CS82 measured in a case where the read head 15R1 is placed at a radial position RP82. In FIG. 8, the points P81 and P82 are indicative of consecutively measured values. In FIG. 8, CS81<0 and CS82>0.

In the example illustrated in FIG. 7, the position detector 620 positions the head 15 at each of cracks separated from one another by a spacing SPT1 in the radial direction from the outer side toward the inner side of the disk 10, measures the radial positions RPR1 and RPR2 at each of the plurality of tracks with the head 15 positioned thereat, and generates each of a plurality of lateral deviations CS in accordance with Equation (7) using the measured plurality of radial positions RPR1 and RPR2. The position detector 620 detects, among the generated plurality of lateral deviations CS, two consecutive lateral deviations P71 (CS71, RP71) and P72 (CS72, RP72) respectively having a negative value and a positive value. The position detector 620 generates an estimated value RP0e1 in accordance with Equation using the lateral deviations P71 (CS71, RP71) and P72 (CS72, RP72).

In the example illustrated in FIG. 8, the position detector 620 positions the head 15, in an area near the position indicated by the generated estimated value RP0e1, at each of tracks separated from one another by a spacing SPT2 smaller than the spacing SPT1 in the radial direction from the outer side toward the inner side, measures the radial positions RPR1 and RPR2 at each of the plurality of tracks with the head 15 positioned thereat, and generates each of a plurality of lateral deviations CS in accordance with Equation (7) using the measured plurality of radial positions RPR1 and RPR2. The position detector 620 detects, among the generated plurality of lateral deviations CS, two consecutive lateral deviations P81 (CS81, RP81) and P82 (CS82, RP82) respectively having a negative value and a positive value. The position detector 620 generates an estimated value RP0e2 in accordance with Equation (9) using the lateral deviations P81 (CS81, RP81) and P82 (CS82, RP82). The position detector 620 sets the generated estimated value RP0e2 as the reference position RP0. If the reference position RP0 is set, the radial spacing between the plurality of tracks at which the head 15 is positioned may not be constant. Furthermore, the position detector 620 may not generate an estimated value RP0e2 and may set the estimated value RP0e1 as the reference position RP0. The position detector 620 may not generate an estimated value RP0e1. For example, the position detector 620 may position the head 15, in a prescribed area of the disk 10, at each of tracks separated from one another by the spacing SPT2 in the radial direction, measure the radial positions RPR1 and RPR2 at each of the plurality of tracks with the head 15 positioned thereat, generate each of a plurality of lateral deviations CS in accordance with Equation (7) using the measured plurality of radial positions RPR1 and RPR2, and generate an estimated value RP0e2 based on the generate plurality of lateral deviations CS.

FIG. 9 is a schematic diagram illustrating a measurement method for the reference longitudinal deviation DS0. FIG. 9 illustrates a servo sector SV0 in a prescribed area of the disk 10 and the read head 15R1 and 15R2 positioned in a prescribed area.

In the example illustrated in FIG. 9, the servo sector SV0 includes a preamble area, a servo mark area, a gray code area, a PAD area, an N burst area, a Q burst area, and a post code area. The post code area may not be included in the servo sector SV0.

In the example illustrated in FIG. 9, to measure the reference longitudinal deviation DS0, the position detector 620 places the read head 15R1 at the reference position RP0, and detects a timing when each of the read heads 15R1 and 15R2 read servo mark information at a servo mark position SP0 located at a circumferential position CP0. Alternatively, the position detector 620 may place the read head 15R1 at the reference position RP0, and detect timings when the read heads 15R1 and 15R2 read servo mark information at different servo mark positions. Alternatively, the position detector 620 may detect a timing when the information of an area in the servo sector other than the servo mark area was read.

Figure 10:
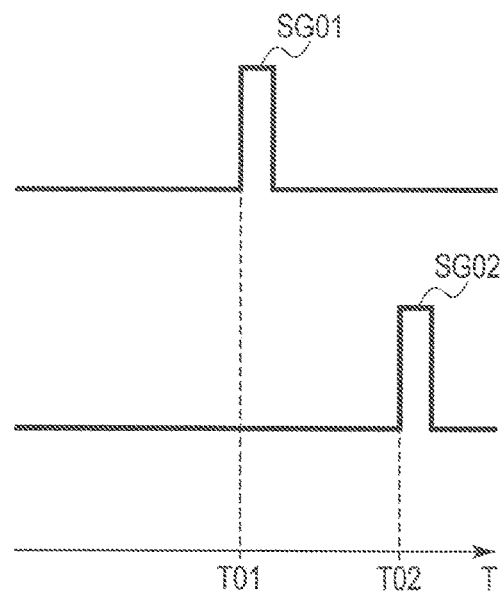
FIG. 10 is a schematic diagram illustrating an example of the measurement method for the reference down track separation.

FIG. 10 is a schematic diagram illustrating an example of a measurement method for the reference longitudinal deviation DS0. In FIG. 10, the abscissa axis indicates time. In FIG. 10, a detection signal SG01 is, for example, a signal indicating that the read head 15R1 has read servo mark information at the servo mark position SP0, and a detection signal SG02 is, for example, a signal indicating that the read head 15R2 has read servo mark information at the servo mark position SP0. The detection signals SG1 and SG2 may be signals indicating that the information of an area in the servo sector other than the servo mark area has been read.

In the example illustrated in FIG. 10, the position detector 620 measures a timing T01 of a rising edge of the detection signal SG01. The position detector 620 measures a timing T02 of a rising edge of the detection signal SG02. The position detector 620 generates a reference longitudinal deviation DS0 in accordance with Equation (8) using the timings T01 and T02 of the detections and the linear velocity V. The position detector 620 associates the generated reference longitudinal deviation DS0 with the head 15 in the table TB and records the table TB in the nonvolatile memory 90, the system area 10b, or the like. For a plurality of the heads 15, the position detector 620 generates a plurality of reference longitudinal deviations DS0 corresponding to the respective heads 15, associates the generated plurality of reference longitudinal deviations DS0 with the respective heads 15 in the table TB, and records the table TB in the nonvolatile memory 90, the system area 10b, or the like.

Figure 11:
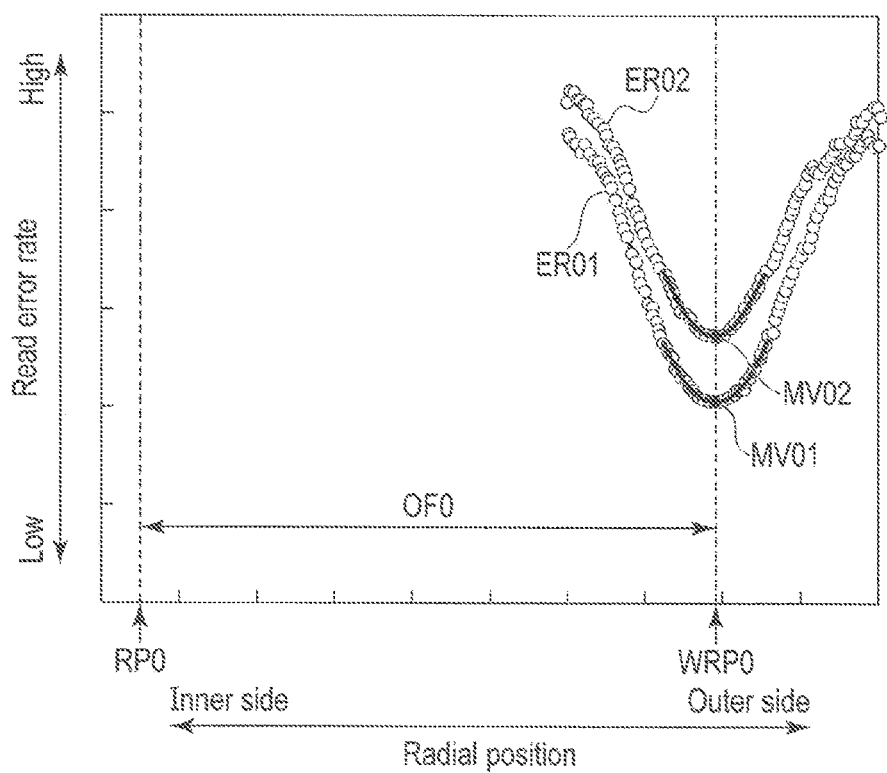
FIG. 11 is a schematic diagram illustrating an example of a measurement method for a reference offset.

FIG. 11 is a schematic diagram illustrating an example of a measurement method for the reference offset OF0. In FIG. 11, the ordinate axis indicates a read error rate, and the abscissa axis indicates the radial position.

In the example illustrated in FIG. 11, as illustrated in FIG. 3A, the position detector 620 places the read head 15R1 at the reference position RP0, and causes the write head 15W to write data to a radial position (hereinafter referred to as the reference write position) WRP0. The position detector 620 causes the read head 15R1 to read the data written by the write head 15W, and measures the read error rate of the read head 15R1 (hereinafter referred to as the first read error rate). The position detector 620 causes the read head 15R2 to read the data written by the write head 15W, and measures the read error rate of the read head 15R2 (hereinafter referred to as the second read error rate). The position detector 620 measures a plurality of the read error rates (hereinafter referred to as the first read error rate distribution) ER01 and a plurality of the read error rates (hereinafter referred to as the second read error rate distribution) ER02 in a prescribed area in the radial direction from the outer side toward the inner side. Alternatively, the position detector 620 may measure the first read error rate distribution ER01 and the second read error rate distribution ER02 in a prescribed area in the radial direction from the outer side toward the inner side. If the read head 15R1 places the read head 15R1 at the reference position RP0 and causes the write head 15W to write data to the radial direction WRP0, a radial position corresponding to a minimum value MV01 of the first read error rate distribution ER01 may be substantially the same as a radial position corresponding to a minimum value MV02 of the second read error rate distribution ER02. This allows the position detector 620 to detect a position corresponding to the minimum value MV01 and the minimum value MV02 as the reference write position WRP0, as illustrated in FIG. 11. Using the reference write position WRP0 and the reference position RP0, the reference offset OF0 is represented by the following equation.

$$OF0 = WRP0 - RP0 \qquad \text{Equation (10)}$$

The position detector 620 generates a reference offset OF0 in accordance with Equation (10) using the reference write position WRP0 and the reference position RP0. The position detector 620 associates the generated reference offset OF0 with the head 15 in the table TB and records the table TB in the nonvolatile memory 90, the system area 10b, or the like. For a plurality of the heads 15, the position detector 620 generates a plurality of reference offsets OF0 corresponding to the respective heads 15, associates the generated plurality of reference offsets OF0 with the respective heads 15 in the table TB, and records the table TB in the nonvolatile memory 90, the system area 10b, or the like. The position detector 620 may read the data written by the write head 15W by using one of the read heads 15R1 and 15R2 used for positioning when the write head 15W is caused to write data to the reference write position WRP0, and generate the reference offset OF0 based on the read error rate. For example, the read head 15R1 is placed at the reference position RP0, and the write head 15W is caused to write data to the radial position (hereinafter referred to as the reference write position) WRP0. The position detector 620 causes the read head 15R1 to read the data written by the write head 15W, measures the read error rate of the read head 15R1 (hereinafter referred to as the first read error rate), and measures a plurality of the first read error rates (hereinafter referred to as the first read error rate distribution) ER01 in a prescribed area in the radial direction from the outer side toward the inner side. If the read head 15R1 is placed at the reference position RP0 and the write head 15W is caused to write data to the radial position WRP0, the position detector 620 may generate a reference offset OF0 in accordance with Equation (10) using the reference position RP0 at which the read head 15R1 has been placed and the radial position reference write position WRP0 corresponding to the minimum value MV01.

FIG. 12 is a schematic diagram illustrating an example of a measurement method for the reference gap GP0. FIG. 12 illustrates a servo sector SV01 in a prescribed area and an adjustment area SV02. The adjustment area SV02 is, for example, a part of the recording area in the disk 10 other than the servo sector SV01. In FIG. 12, the write head 15W and the read heads 15R1 and 15R2 are positioned in the adjustment area SV02. In FIG. 12, for the servo sector SV01, only the post code area is illustrated, with the other areas omitted.

The position detector 620 sets a write timing when the servo data of the servo sector SV01 is not erased by the write head 15W, and causes the write head 15W to write reference data to the adjustment area SV02 at the set write timing. The position detector 620 measures the R/W gap, for example, the reference gap GP0, by detecting a read timing when the data written to the adjustment area SV02 by the write head 15W can be appropriately read by the read head, for example, at least one of the read heads 15R1 and 15R2. The write timing when the servo data of the servo sector SV01 is not erased by the write head 15W and the read timing when the data written to the adjustment area SV02 can be appropriately read each correspond to elapsed time from the time when the information written to the servo sector SV01 was read, for example, the time when the servo mark information was read.

In the example illustrated in FIG. 12, to measure the reference gap GP0, the position detector 620 sets a write timing when the servo data of the servo sector SV01 is not erased by the write head 15W. The position detector 620 places the read head 15R1 at the reference position RP0, and when the read head 1581 arrives at a position SP122 in the adjustment area SV02 at the set write timing, causes the write head 15W to write the reference data to the position SP121 in the adjustment area SV02. In the example illustrated in FIG. 12, the position SP121 where the reference data is written is located at a circumferential position CP121. The arrival position SP122 of the read head 15R1 at the beginning of write is located at a circumferential positron CP122. To measure the reference gap GP0, the position detector 620 may set the write timing when the servo data of the servo sector SV01 is not erased by the write head 15W, and cause the write head 15W to write the reference data to an area other than the adjustment area SV02 at the set write timing.

Figure 13:
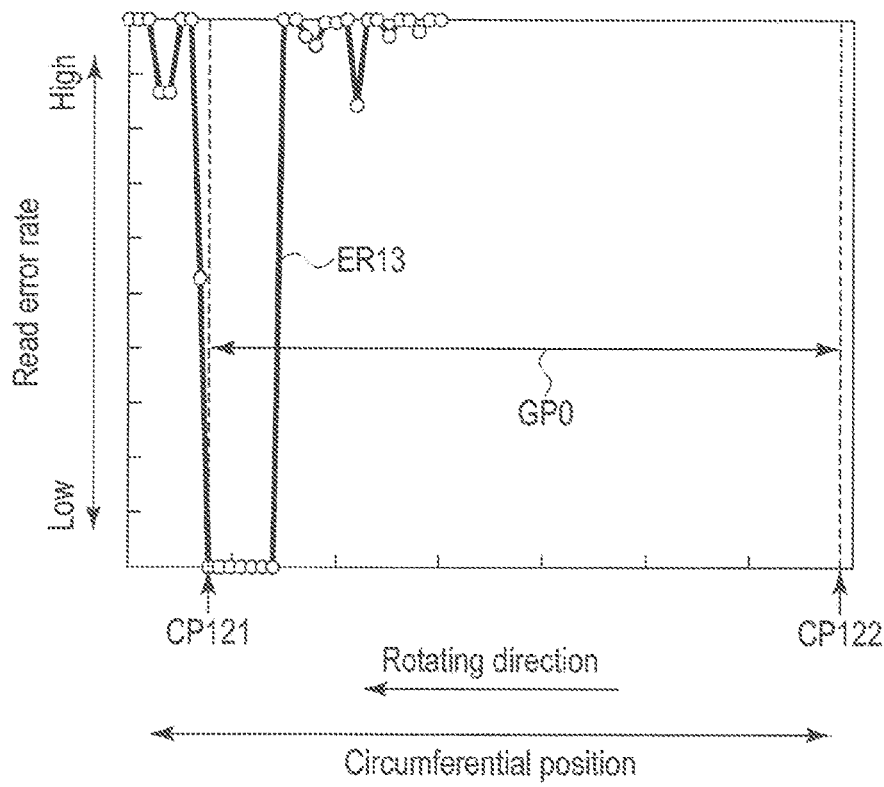
FIG. 13 is a diagram illustrating a change in a read error rate in a circumferential position in a case where reference data is written as illustrated in FIG. 12.

FIG. 13 is a diagram illustrating a change in error rate in the circumferential direction in a case where the reference data is written as illustrated in FIG. 12. In FIG. 13, the ordinate axis indicates the read error rate, and the abscissa axis indicates the circumferential position (or the timing when the data is read). FIG. 13 illustrates a change ER13 in read error rate.

In the example illustrated in FIG. 13, the read error rate is lower in the vicinity of the circumferential position CP121 of the position SP121 where the reference data has been written by the write head 15W. The position detector 620 sets a read timing when the read head 15R1 is caused to read the reference data from an area in the vicinity of the circumferential position CP121, and causes the read head 15R1 to read the data at the set read timing. If the read error rate of the data read by the read head 15R1 is lower than the read error rate of surrounding data, the position detector 620 may determine that the data read by the read head 15R1 is the reference data written by the write head 15W. This allows the position detector 620 to detect a read timing for the data read by the read head 15R1 and having a read error rate lower than the surrounding read error rate, as the timing when the reference data written by the write head 15W was read by the read head 15R1. The position detector 620 may detect this timing as the timing when the reference data written to an area other than the adjustment area by the write head 15W was read by the read head 15R1.

Figure 14:
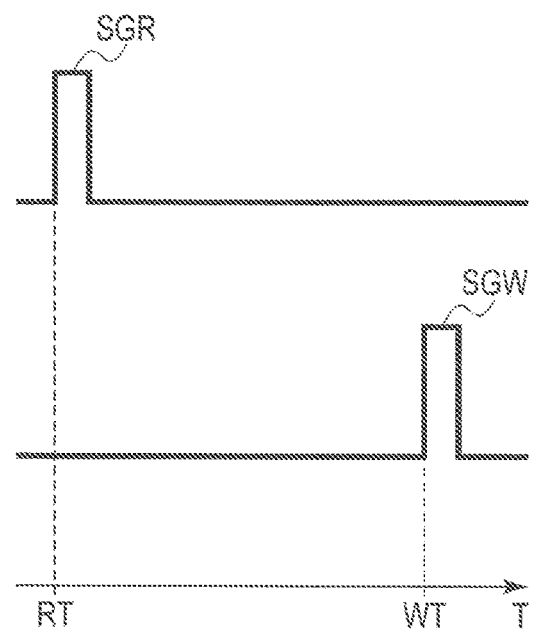
FIG. 14 is a schematic diagram illustrating an example of the measurement method for the reference gap.

FIG. 14 is a schematic diagram illustrating an example of a measurement method for the reference gap GP0. In FIG. 14, the abscissa axis indicates time. In FIG. 14, a write signal SGW is, for example, a signal indicating that the read head 15R1 has arrived at the position SP122 and the write head 15W has been caused to start writing the reference data to the position SP121. A detection signal SGR is, for example, a signal indicating that the reference data written to the adjustment area SV02 by the write head 15W has been read by the read head 15R1. The write signal SGW may be a signal indicating the read head 15R1 has arrived at a prescribed position in a prescribed area and the write head 15W has been caused to start writing data to an area other than the adjustment area SV02. Alternatively, the detection signal SGR may be a signal indicating that the reference data written to an area other than the adjustment area SV02 has been read by the read head 15R1.

In the example illustrated in FIG. 14, the position detector 620 acquires a timing WT of a rising edge of the write signal SGW. The position detector 620 acquires a timing FT of a rising edge of the detection signal SGR. Using the timings WT and RT, the reference gap GP0 is represented by the following equation.

$$GP0 = V \times (WT - RT) \qquad \text{Equation (11)}$$

The position detector 620 generates a reference gap GP0 in accordance with Equation (11) using the detected timings WI and RT and the linear velocity V. The position detector 620 associates the generated reference gap GP0 with the head 15 in the table TB, and records the table TB in the nonvolatile memory 90, the system area 10b, or the like. For a plurality of the heads 15, the position detector 620 generates a plurality of reference gaps GP0 corresponding to the respective heads 15, associates the generated plurality of reference gaps GP0 with the respective heads 15 in the table TB, and records the table TB in the nonvolatile memory 90, the system area 10b, or the like.

The generation unit 630 generates, if target data is to be read, a correction value CRV used to place a reference portion on the target data, and outputs the generated correction value CRV to the read/write controller 610.

For example, if the target data is to be read, the generation unit 630 acquires reference placement information (the reference longitudinal deviation DS0, the reference offset GP0, and the reference gap GP0) corresponding to the head 15 from the table TB recorded in the nonvolatile memory 90, the system area 10b, and the like. For a plurality of the heads 15, the generation unit 630 acquires, from the table TB, the reference placement information. (the reference longitudinal deviation DS0, the reference offset OF0, and the reference gap GP0) corresponding to the current head 15 which is to read the target data. The generation unit 630 acquires, from the position detector 620, the longitudinal deviation DS and the lateral deviation CS at the current radial position of the head 15 positioned to read the target data. The generation unit 630 generates an R/W offset OF1 in accordance with Equation (4) using the acquired parameters (the reference longitudinal deviation DS0, the reference offset OF0, the reference gap GP0, the longitudinal deviation GE, and the lateral deviation CS).

The generation unit 630 adjusts the R/W offset OF1 using an adjustment value in accordance with the read method to generate a correction value CRV. For example, if the target data is to be read by the read head 15R1, the generation unit 630 outputs the R/W offset OF1 to the read/write controller 610 as the correction value CRV without adjusting the R/W offset OF1. If the target data is to be read by the read head 15R2, the generation unit 630 adjusts the R/W offset OF1 to an R/W offset OF2 in accordance with Equation (5) using the adjustment value, for example, the lateral deviation CS, and outputs the adjusted R/W offset OF2 to the read/write controller 610 as the correction value CRV. If the target data is to be read by the read heads 15R1 and 15R2, the generation unit 630 adjusts the R/W offset OF1 to an R/W offset OF3 in accordance with Equation (6) using the adjustment U value, for example, CS/2, and outputs the adjusted R/W offset OF3 to the read/write controller 610 as the correction value CRV.

Figure 15:
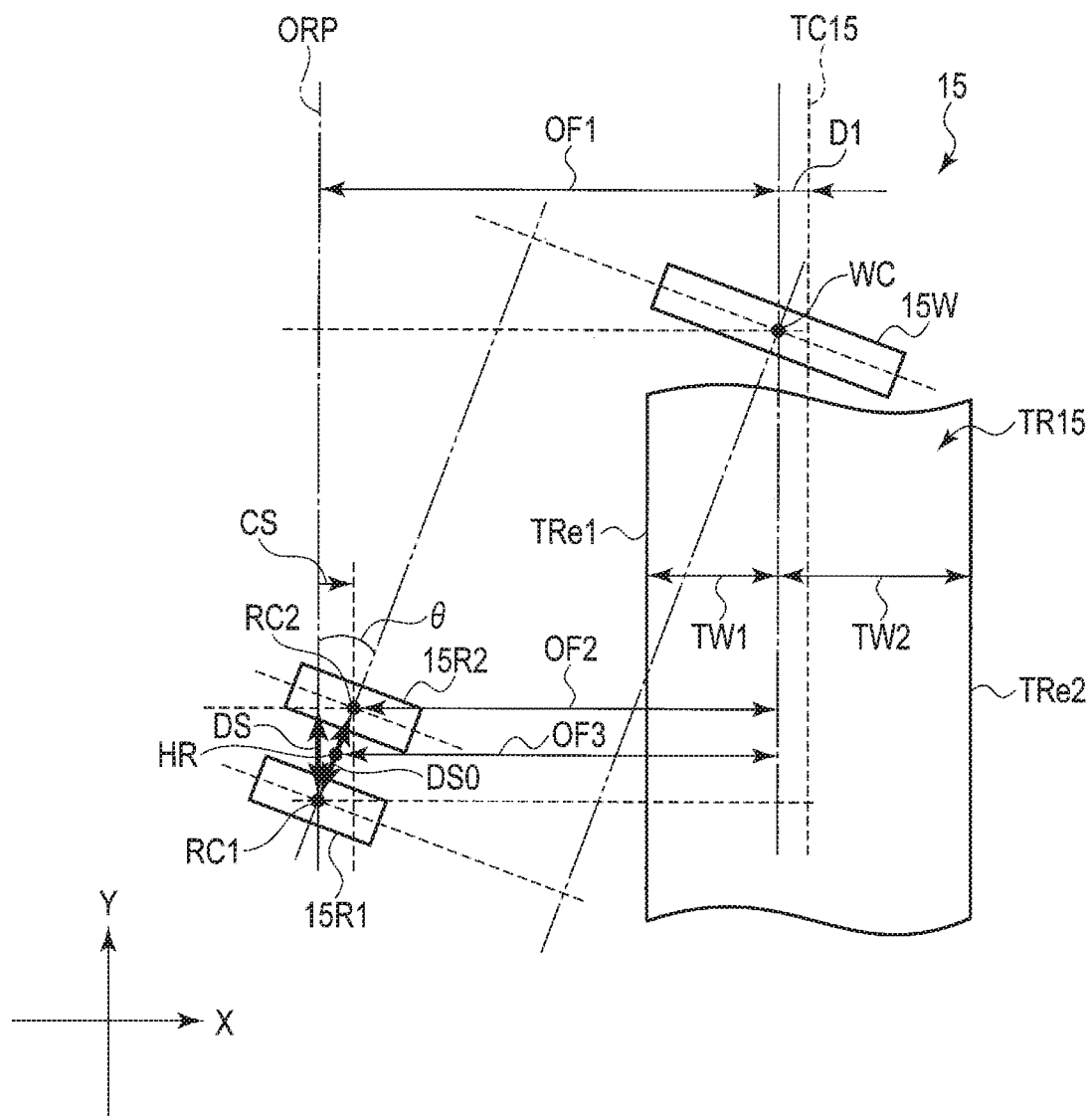
FIG. 15 is a diagram illustrating an example of a generation method for a correction value corresponding to a characteristic of target data.

FIG. 15 is a diagram illustrating an example of a generation method for the correction value CRV corresponding to the characteristics of the target data. FIG. 15 illustrates a track TR15 written by the read head 15R1 placed at the radial position ORP. A central portion TC15 indicates a central position of the track TR15 in the first direction X. FIG. 15 illustrates a radial distance TW1 between the central portion WC and an end TRe1 of the track TR15 and a radial distance TW2 between the central portion WC and an end TRe2 of the track TR15.

The generation unit 630 adjusts the R/W offset OF1 using the adjustment value in accordance with the characteristics of the target data (or target track) to generate a correction value CRV. In the example illustrated in FIG. 15, the central portion WC of the write head 15W is displaced, by a distance D1 in the first direction X (radial direction), from the central portion TC15 of the track TR15 written by the write head 15W. By way of example, the generation unit 630 adjusts the R/W offset OF1 using the adjustment value, for example, the distance D1, to generate a correction value CRV. In this case, using the R/W offset OF1 and the distance D1, the correction value CRV is represented by the following equation.

$$CRV = OF1 + D1 \qquad \text{Equation (12)}$$

Furthermore, using the distances TW1 and TW2, the distance D1 is represented by the following equation.

$$D1 = (TW2 - TW1)/2 \qquad \text{Equation (13)}$$

The generation unit 630 generates a distance D1 in accordance with Equation (13) using the distance TW1 and the distance TW2, generates a correction value CRV by adjusting the R/W offset OF1 in accordance with Equation (12) using the generated distance D1, and outputs the generated correction value CRV to the read/write controller 610. In the example illustrated in FIG. 15, as is the case with the R/W offset OF1, the generation unit 630 may generate a correction value CRV by adjusting the R/W offset OF2 using the distance D1 or generate a correction value CRV by adjusting the R/W offset OF3 using the distance D1.

Figure 16:
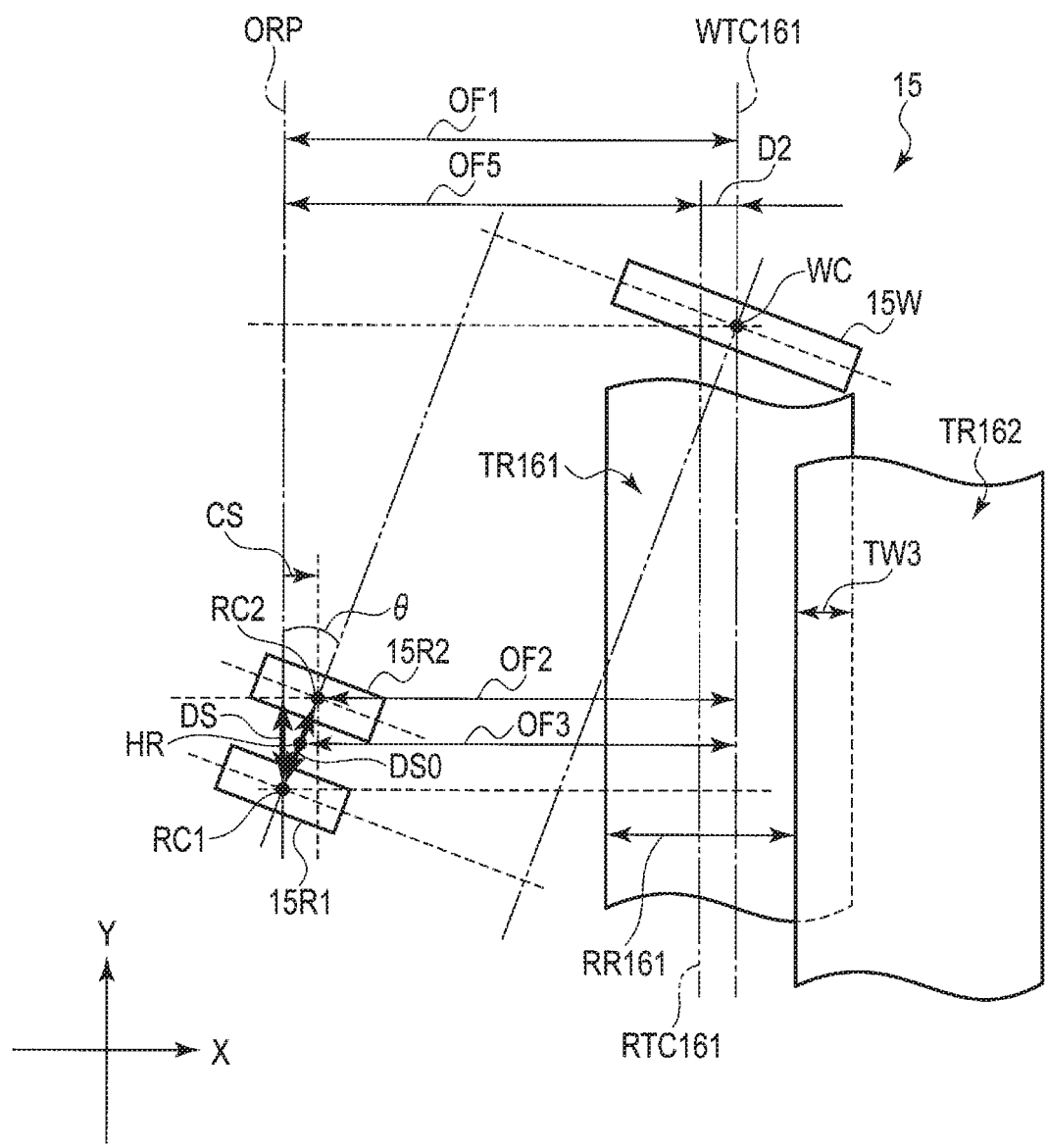
FIG. 16 is a diagram illustrating an example of a generation method for a correction value corresponding to a write method.

FIG. 16 is a diagram illustrating an example of a generation method for the correction value CRV corresponding to the write method. FIG. 16 illustrates a track TR161 written by the read head 15R1 placed at the radial position ORP, and a track TR162 overlapping the track TR161. FIG. 16 illustrates a remaining area RR161 of the track TR161 which is not overlapped by the track TR162. FIG. 16 also illustrates a distance TW3, in the first direction X, of an overlapping area between the track TR161 and the track TR162. A central portion WTC161 is indicative of the central position of the track TR161 in the first direction X. A central portion RTC161 is indicative of the central position of the area RR161 in the first direction X.

The generation unit 630 generates a correction value CRV by adjusting the R/W offset OF1 using the adjustment value in accordance with the write method. In the example illustrated in FIG. 16, since the track TR16 partially overlaps the track TR161, the central portion WTC161 and the central portion RTC161 are displaced from each other by a distance D2 in the first direction X (radial direction). By way of example, the generation unit 630 generates a correction value CRV by adjusting the R/W offset OF1 using the adjustment value, for example, the distance D2. In this case, using the R/W offset OF1 and the distance D2, the correction value CRV is represented by the following equation.

$$CRV = OF1 \pm D2 \qquad \text{Equation (14)}$$

Furthermore, using the distance TW3, the distance D2 is represented by the following equation.

$$D2 = TW3/2 \qquad \text{Equation (15)}$$

The generation unit 630 generates a distance D2 in accordance with Equation (15) using the distance TW3, generates a correction value CRV by adjusting the R/W offset OF1 in accordance with Equation (14) using the generated distance D2, and outputs the generated correction value CRV to the read/write controller 610. In the example illustrated in FIG. 16, as is the case with the R/W offset OF1, the generation unit 630 may generate a correction value CRV by adjusting the R/W offset OF2 using the distance D2 or generate a correction value CRV by adjusting the R/W offset OF3 using the distance D2.

If the R/W offset OF1 is corrected using the distance D1 or D2 as illustrated in FIG. 15 and FIG. 16, the distances D1 and D2 may be pre-measured and saved to the nonvolatile memory or the like.

Figure 17:
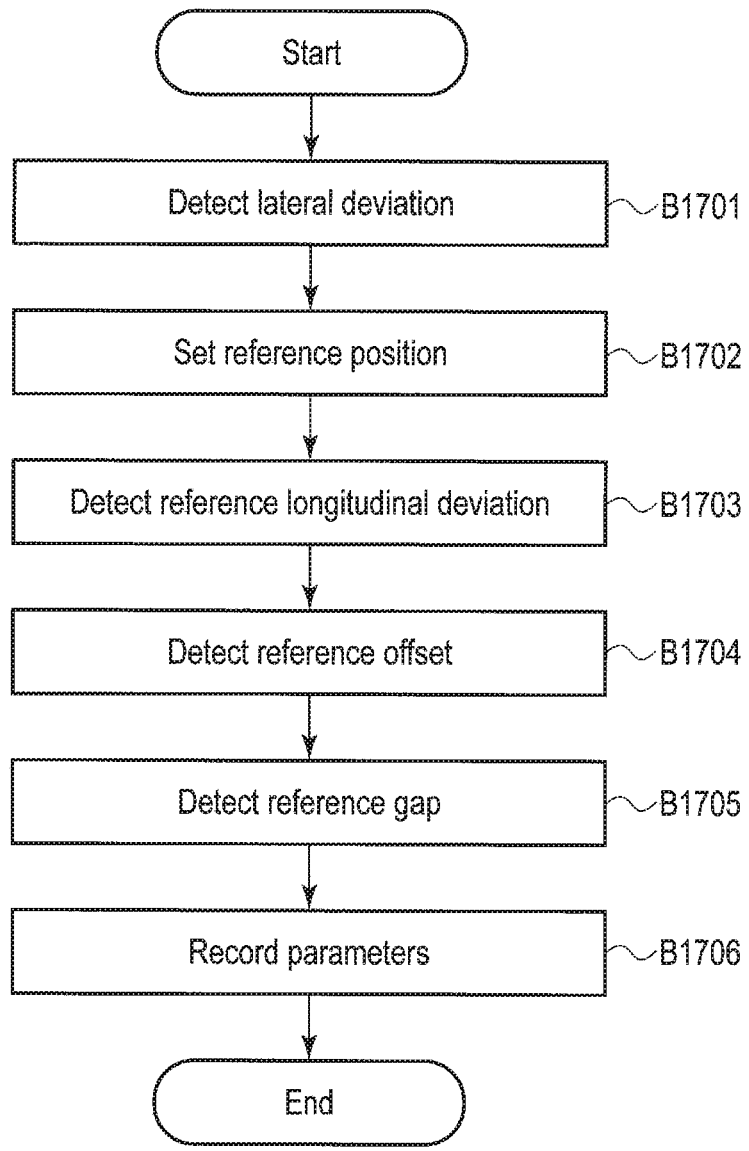
FIG. 17 is a flowchart of a measurement method for parameters for the reference position according to the first embodiment.

FIG. 17 is a flowchart of a measurement method for the parameters for the reference position according to the first embodiment.

The MPU 60 measures the lateral deviation CS at a plurality of radial positions along the radial direction of the disk 10 (B1701). The MPU 60 detects a radial position with a lateral deviation of 0 among the measured plurality of lateral deviations CS, and sets the detected radial position with a lateral deviation of 0 (or a value close to 0) as the reference position RP0 (B1702). The MPU 60 positions the head 15 at the reference position RP0 to measure the reference longitudinal deviation DS0 (B1703). For example, the MPU 60 places the read head 15R1 at the reference position RP0, and measures the reference longitudinal deviation DS0 based on the timing when the servo mark information was read by the read head 15R1 and the timing when the servo mark information was read by the read head 15R2. The MPU 60 positions the head 15 at the reference position RP0 to measure the reference offset CE0 (B1704). For example, the MPU 60 places the read head 15R1 at the reference position RP0 and causes the write head 15W to write data. The MPU 60 measures the reference offset OF0 based on the read error rate in a case where the data written by the write head 15W is read by the read head 15R1 and the read error rate in a case where the data written by the write head 15W is read by the read head 15R2. The MPU 60 positions the head 15 at the reference position RP0 to measure the reference gap GP0 (B1705). For example, the MPU 60 places the read head 15R1 at the reference position RP0 and causes the write head 15W to write data. The MPU 60 measures the reference gap GP0 based on the write timing when the data was written by the write head 15W and the read timing when the data written by the write head 15W was read by the read head 15R1. The MPU 60 records the measured reference placement information (the reference longitudinal deviation DS0, the reference offset OF0, and the reference gap GP0) in the nonvolatile memory 90 or the system area 10b as the table TB (B1706), and ends the processing.

Figure 18:
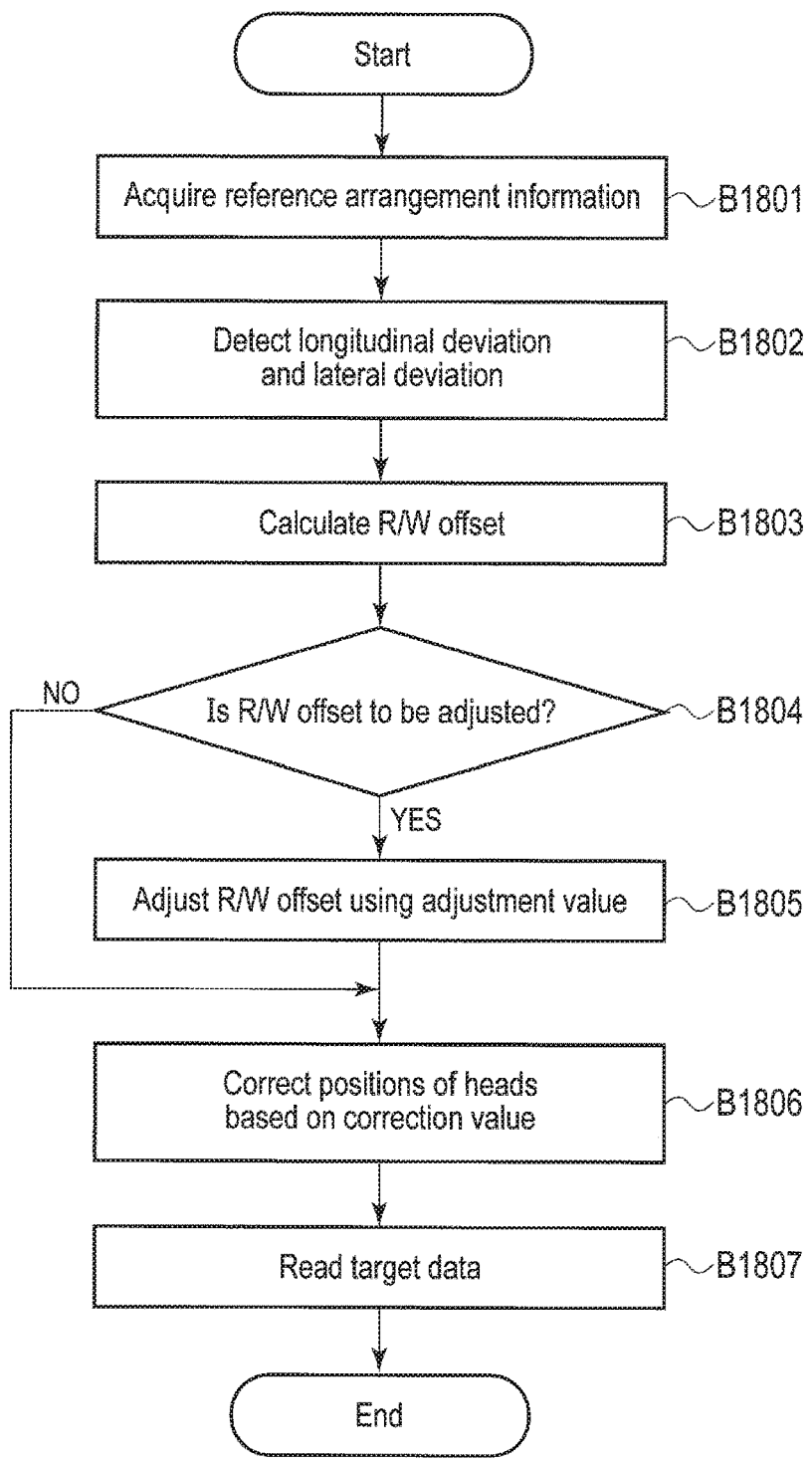
FIG. 18 is a flowchart of an R/W offset correction method according to the first embodiment.

FIG. 18 is a flowchart of an R/W offset correction method according to the present embodiment.

If the target data is to be read by the head 15, the MPU 60 acquires the reference placement information (the reference longitudinal deviation DS0, the reference offset OF0, and the reference gap GP0) from the table TB stored in the nonvolatile memory 90, the system area 10b, or the like and corresponding to the head 15 (B1801). The MPU 60 detects the longitudinal deviation DS and the lateral deviation CS at the current radial position of the head 15 positioned to read the target data (B1802). The MPU 60 generates an R/W offset OF1 between the read head 15R1 and the write head 15W based on the parameters (the reference longitudinal deviation DS0, the reference offset OF0, the reference gap GP0, the longitudinal deviation DS, and the lateral deviation CS) (B1803). For example, the MPU 60 generates an R/W offset OF1 in accordance with Equation (4) using the reference longitudinal deviation DS0, the reference offset OF0, the reference gap GP0, the longitudinal deviation DS, and the lateral deviation CS. The MPU 60 determines whether or not to adjust the R/W offset OF1 (B1804). In a case of determining that the R/W offset OF1 is to be adjusted (YES in B1804), the MPU 60 generates a correction value CRV by adjusting the R/W offset OF1 using the adjustment value (B1805), and proceeds to processing in B1806. In a case of determining that the R/W offset OF1 is to be adjusted (NO in B1804), the MPU 60 uses the R/W offset OF1 as the correction value to correct the position of the head 15 based on the correction value (B1806). For example, the NPU 60 corrects the position of the reference portion on the disk 10 based on the correction value. The NPU 60 reads the target data (B1807), and ends the processing. For example, the MPU 60 places the reference portion on the target data, reads the target data, and ends the processing.

According to the present embodiment, the magnetic disk device 1 comprises the head 15 including the write head 15W, the read head 15R1, and the read head 15R2. To read the target data, the magnetic disk device 1 generates a correction value based on the geometric placement of the write head 15W, the read head 15R1, and the read head 15R2, and reads the target data based on the generated correction value. For example, the magnetic disk device 1 acquires the reference longitudinal deviation DS0, the reference offset OF0, and the reference gap GP0 from the table TB recorded in the nonvolatile memory 90, the system area 10b, or the like and corresponding to the head 15. The magnetic disk device 1 detects the longitudinal deviation DS and the lateral deviation CS at the current radial position of the head 15 positioned to read the target data. The magnetic disk device 1 generates an R/W offset OF1 in accordance with Equation (4) using the reference longitudinal deviation DS0, the reference offset OF0, the reference gap GP0, the longitudinal deviation DS, and the lateral deviation CS. The magnetic disk device 1 adjusts the R/W offset OF1 in accordance with the read method, the write method, the characteristics of the target data (target track), or the like to generate a correction value CRV, and reads the target data based on the generated correction value CRV. Thus, the magnetic disk device 1 may hold the reference longitudinal deviation DS0, the reference offset OF0, and the reference gap GP0 in the nonvolatile memory 90, the system area 10b, or the like for each head 15 in the form of the table TB, and need not hold R/W offsets measured at a plurality of tracks as in the related art, enabling a reduction in the capacity of data recorded in the nonvolatile memory 90, the system area 10b, or the like. This also eliminates the need to perform measurement at a plurality of tracks for each head as in the related art, enabling a reduction in the time needed for adjustment. Furthermore, the magnetic disk device 1 is capable of efficiently generating a correction value to allow offset correction to be efficiently performed.

Now, magnetic disk devices according to a modification and other embodiments will be described. The same components of the modification and the other embodiments as the corresponding components of the above-described embodiment are denoted by the same reference numerals and will not be described in detail.

(Modification 1)

The magnetic disk device 1 according to Modification 1 is different from the above-described embodiment in the generation method for the R/W offset OF1.

As seen in FIG. 3B, the distances OD1 and OD2 are represented by the following equation.

$$OD1 = GP0 \times \sin\theta \qquad \text{Equation (16)}$$

$$OD2 = OF0 \times \cos\theta \qquad \text{Equation (17)}$$

Based on Equation (1), Equation (16), and Equation (17) described above, the R/W offset OF1 is represented by the following equation.

$$OF1 = GP0 \times \sin\theta + OF0 \times \cos\theta \qquad \text{Equation (18)}$$

In the example illustrated in FIG. 3B, θ denotes, for example, a positive value. As seen in FIG. 3B, the skew angle θ between the two read heads 15R1 and 15R2 is represented by the following equation.

$$\theta = a\tan(CS/DS) \qquad \text{Equation (19)}$$

As described above, the R/W offset OF1 may be calculated in accordance with Equation (18) and Equation (19) using the reference offset OF0, the reference longitudinal deviation DS0, the reference gap GP0, the lateral deviation CS, and the longitudinal deviation DS.

The generation unit 630 generates an R/W offset OF1 in accordance with Equation (18) and Equation (19) using the acquired parameters (the reference longitudinal deviation DS0, the reference offset OF0, the reference gap GP0, the longitudinal deviation DS, and the lateral deviation CS).

According to the modification, the magnetic disk device 1 is capable of generating an R/W offset OF1 in accordance with Equation (18) and Equation (19) using the reference longitudinal deviation P30, the reference offset OF0, the reference gap GP0, the longitudinal deviation DS, and the lateral deviation CS. This enables the magnetic disk device 1 to efficiently generate a correction value to allow offset correction to be efficiently performed.

Second Embodiment

A magnetic disk device 1 according to a second embodiment is different from the magnetic disk device according to the above-described embodiment in that the temperature of the head 15 changes when data is written.

Figure 19:
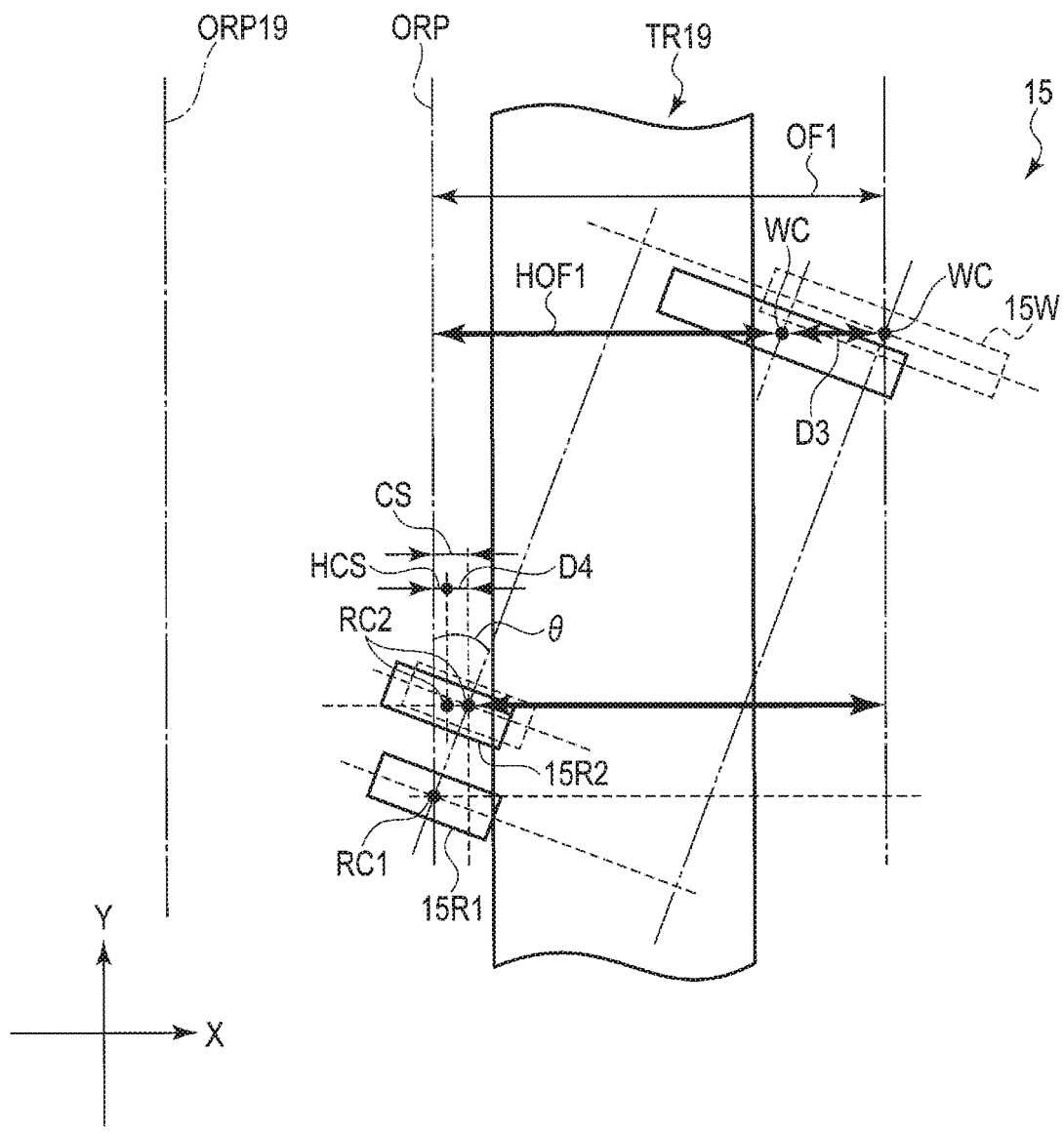
FIG. 19 is a diagram illustrating an example of changes in R/W offset and lateral deviation resulting from a change in the temperature of the head.

FIG. 19 is a diagram illustrating an example of changes R/W offset OF1 and lateral deviation CS resulting from a change in the temperature of the head 15. FIG. 19 illustrates a track TR19 written with the head 15 at a temperature TM1 and with the read head 15R1 placed at the radial position ORP19.

In a case where data is written with the head 15 at a temperature TM2 higher than the temperature TM1 and with the read head 15R1 placed at the radial position ORP corresponding to a position where a track adjacent to the track TR19 on the outer side thereof (hereinafter referred to as the adjacent track) is written, the write head 15W shifts in the first direction X compared to a case where the data is written with the head 15 at the temperature TM1 and with the read head 15R1 placed at the radial position ORP. In the example illustrated in FIG. 19, if the head 15 is at the temperature TM1 and the read head 15R1 is placed at the radial position ORP, the write head 15W is spaced from the read head 15R1 by the R/W offset OF1 in the first direction X. In the case where data is written with the head 15 at the temperature TM2 and with the read head 15R1 placed at the radial position ORP, the write head 15W shifts toward the inner side in the first direction X by a distance D3 compared to the case where data is written with the head 15 at the temperature TM1 and with the read head 15R1 placed at the radial position ORP. Thus, if the head 15 is at the temperature TM2 and thread head 15R1 is placed at the radial position ORP, the write head 15W is spaced from the read head 15R1 by an R/W offset HOF1 in the first direction X. In this case, if the write head 15W is caused to write data to the track adjacent to the track TR19 on the outer side thereof, a part of the track TR19 may be deleted. Furthermore, if the read head 15R1 placed at the radial position ORP is offset-corrected based on the R/W offset OF1 between the write head 15W and the read head 15R1 in the state where the head 15 is at the temperature TM1, and data written with the head 15 at the temperature TM2 and with the read head 15R1 placed at the radial position ORP is read by the read head 15R1, then a read error may occur.

If data is written with the head 15 at the temperature TM2 and with the read head 15R1 placed at the radial position ORP, the head 15 is adjustably moved toward the outer side in the first direction X to the position of the distance D3, and the adjacent track is written with the write head 15W at the temperature TM2 to prevent erasing the track TR19 written by the write head 15W at the temperature TM1. If the offset resulting from a change in the temperature of the head and corresponding to the distance D3 falls within a prescribed threshold range, for example, within the range in which the adjacent track is not erased, data may be written without the need to adjust the position of the write head 15W. Furthermore, if data written with the head 15 at the temperature TM2 and with the read head 15R1 placed at the radial position ORP is read by the read head 15R1, the R/W offset OF1 between the write head 15W and the read head 15R1 in the state where the head 15 is at the temperature TM1 is adjustably shifted toward the outer side by the distance D3. Then, the read head 15R1 is offset-corrected based on the adjusted R/W offset, and the corresponding data is read.

In the case where data is written with the head 15 at the temperature TM2 and with the read head 15R1 placed at the radial position ORP, the read head 15R2 also shifts in the first direction X compared to the case where data is written with the head 15 at the temperature TM1 and with the read head 15R1 placed at the radial position ORP. In the example illustrated in FIG. 19, if the head 15 is at the temperature TM1 and the read head 15R1 is placed at the radial position. ORP, the read head 15R2 is spaced from the read head 15R1 by the lateral deviation CS in the first direction X. In the case where data is written with the head 15 at the temperature TM2 and with the read head 15R1 placed at the radial position ORP, the read head 15R2 shifts toward the inner side in the first direction X by a distance (change amount) D4 compared to the case where data is written with the head 15 at the temperature TM1 and with the read head 15R1 placed at the radial position ORP. Thus, if the read head 15R1 is placed at the radial position ORP with the head 15 at the temperature TM2, the read head 15R2 is spaced from the read head 15R1 in the first direction X by the lateral deviation HCS.

Figures 20, 21:
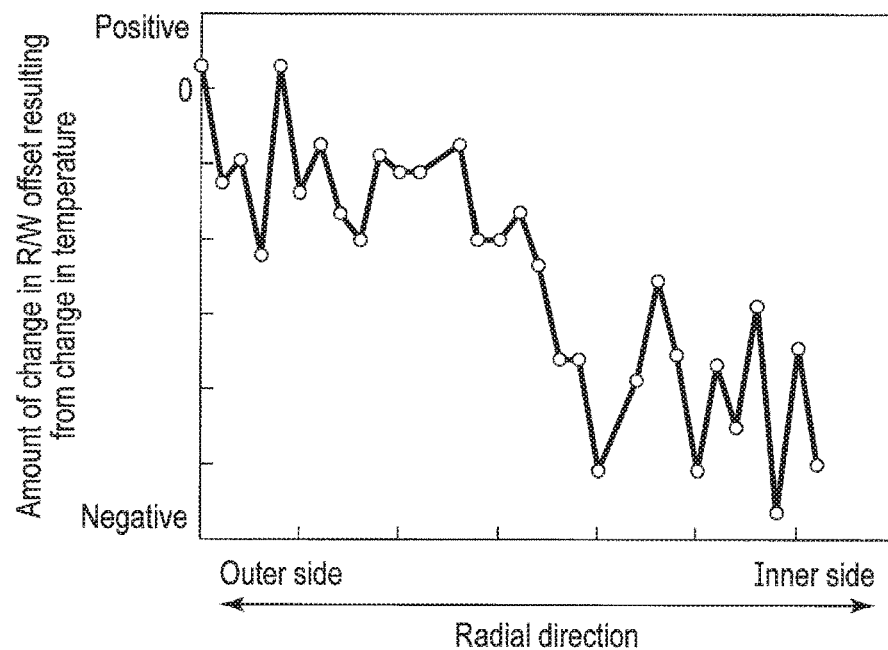
FIG. 20 is a diagram illustrating an example of the amount of change in R/W offset resulting from a change in the temperature of the head.
FIG. 21 is a diagram illustrating an example of the amount of change in lateral deviation resulting from a change in the temperature of the head.

FIG. 20 is a diagram illustrating an example of the amount of change in R/W offset OF1 resulting from a change in the temperature of the head 15. In FIG. 20, the ordinate axis indicates the amount of change in R/W offset OF1 resulting from a change in the temperature of the head 15, and the abscissa axis indicates the radial direction of the disk 10. FIG. 20 illustrates an example of the amount of change in R/W offset OF1 at a radial position in a case where the temperature of the head 15 is changed from the temperature TM1 to the temperature TM2.

As illustrated in FIG. 20, with a change in the temperature of the head 15, the amount of change in R/W offset OF1 increases in a negative direction toward the inner side of the disk 10.

FIG. 21 is a diagram illustrating an example of the amount of change in lateral deviation CS resulting from a change in the temperature of the head 15. In FIG. 21, the ordinate axis indicates the amount of change in lateral deviation CS resulting from a change in the temperature of the head 15, and the abscissa axis indicates the radial direction of the disk 10. FIG. 21 illustrates an example of the amount of change in lateral deviation CS at a radial position in the case where the temperature of the head 15 is changed from the temperature TM1 to the temperature TM2.

As illustrated in FIG. 21, with a change in the temperature of the head 15, the amount of change in lateral deviation CS increases in the negative direction toward the inner side of the disk 10 as is the case with the R/W offset OF1.

Figure 22:
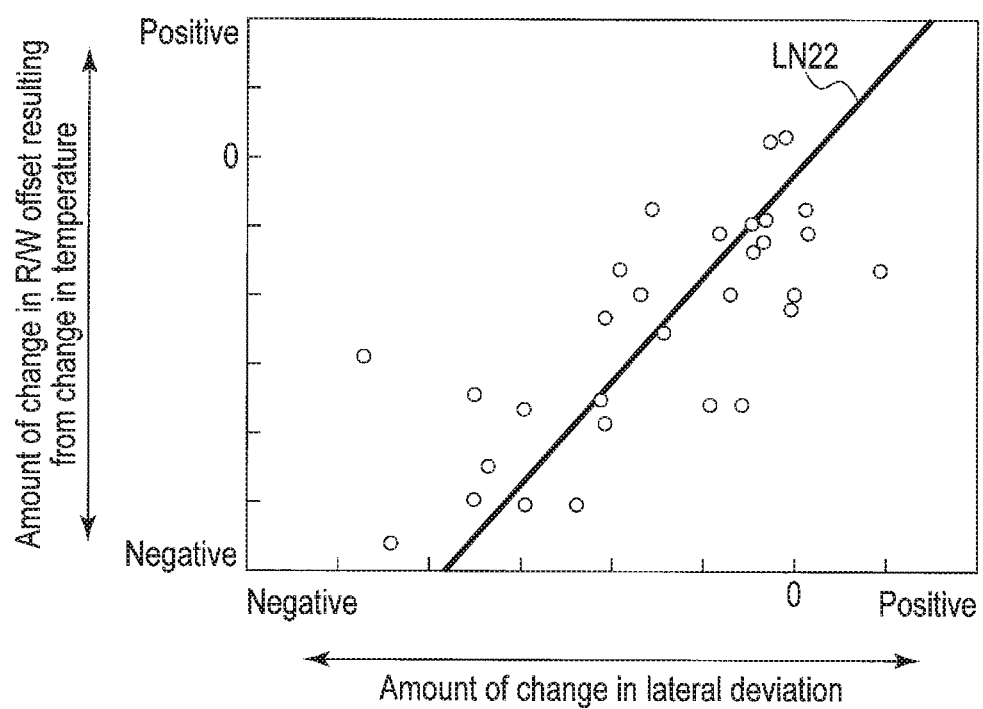
FIG. 22 is a diagram illustrating an example of a correlation between the amount of change in R/W offset and the amount of change in lateral deviation resulting from a change in the temperature of the head.

FIG. 22 is a diagram illustrating an example of a correlation between the amount of change in R/W offset OF1 and the amount of change in lateral deviation CS resulting from a change in the temperature of the head 15. In FIG. 22, the ordinate axis indicates the amount of change in R/W offset OF1 resulting from a temperature change, and the abscissa axis indicates the amount of change in lateral deviation CS resulting from a change in the temperature of the head 15. A plurality of points in FIG. 22 indicate the respective measured values of the amount of change in R/W offset OF1 with respect to the amount of change in lateral deviation CS. Furthermore, in FIG. 22, an approximation line LN22 indicates an approximation line for the plurality of points.

Based on the approximation line LN22 illustrated in FIG. 22, the amount of change in R/W offset OF1 and the amount of change in lateral deviation CS can be approximated in accordance with a proportional relationship. Thus, the amount of change in R/W offset OF1 can be detected by pre-measuring the amount of change in lateral deviation CS during the manufacturing process or the like. For example, the position detector 620 acquires, from the memory or the like, the lateral deviation CS in a state where the head 15 is at the temperature TM1, also detects the lateral deviation HCS in a state where the head 15 is at the temperature TM2, and detects the amount of change D4 based on a difference between the acquired lateral deviation CS and the detected lateral deviation HCS. The lateral deviation CS in the state where the head 15 is at the temperature TM1 may be held in the memory, for example, the volatile memory 70, the nonvolatile memory 90, or the system area 10b. The position detector 620 determines whether or not the amount of change D4 is smaller than a threshold or greater than or equal to the threshold. The threshold is, for example, the amount of change lateral deviation CS corresponding to the amount of change in R/W offset OF1 affecting the adjacent track or the like. In a case of detecting that the amount of change D4 is smaller than the threshold, the position detector 620 determines that the R/W offset OF1 remains unchanged, and ends the processing. In a case of detecting that the amount of change D4 is greater than or equal to the threshold, the position detector 620 determines that the R/W offset OF1 has changed, and executes a specified process. In the specified process, the position detector 620 outputs a signal to the read/write controller 610 to avoid write processing and read processing until the R/W offset OF1 is determined to remain unchanged. Alternatively, in the specified process, the position detector 620 may calculate the amount of change D3 in R/W offset OF1 from the detected amount of change D4 in lateral deviation CS, and during write, use the amount of change D3 to adjust the position of the write head 15W to allow data to be written to the same track position as that in the state where the head 15 is at the temperature TM1. Furthermore, during read, the amount of change D3 may be used to adjust the position of at least one of the read heads 15R1 and 15R2. The position detector 620 may detect the amount of change in lateral deviation CS based on the ratio of the lateral deviation CS to the lateral deviation HCS to detect a change in R/W offset OF1.

Figure 23:
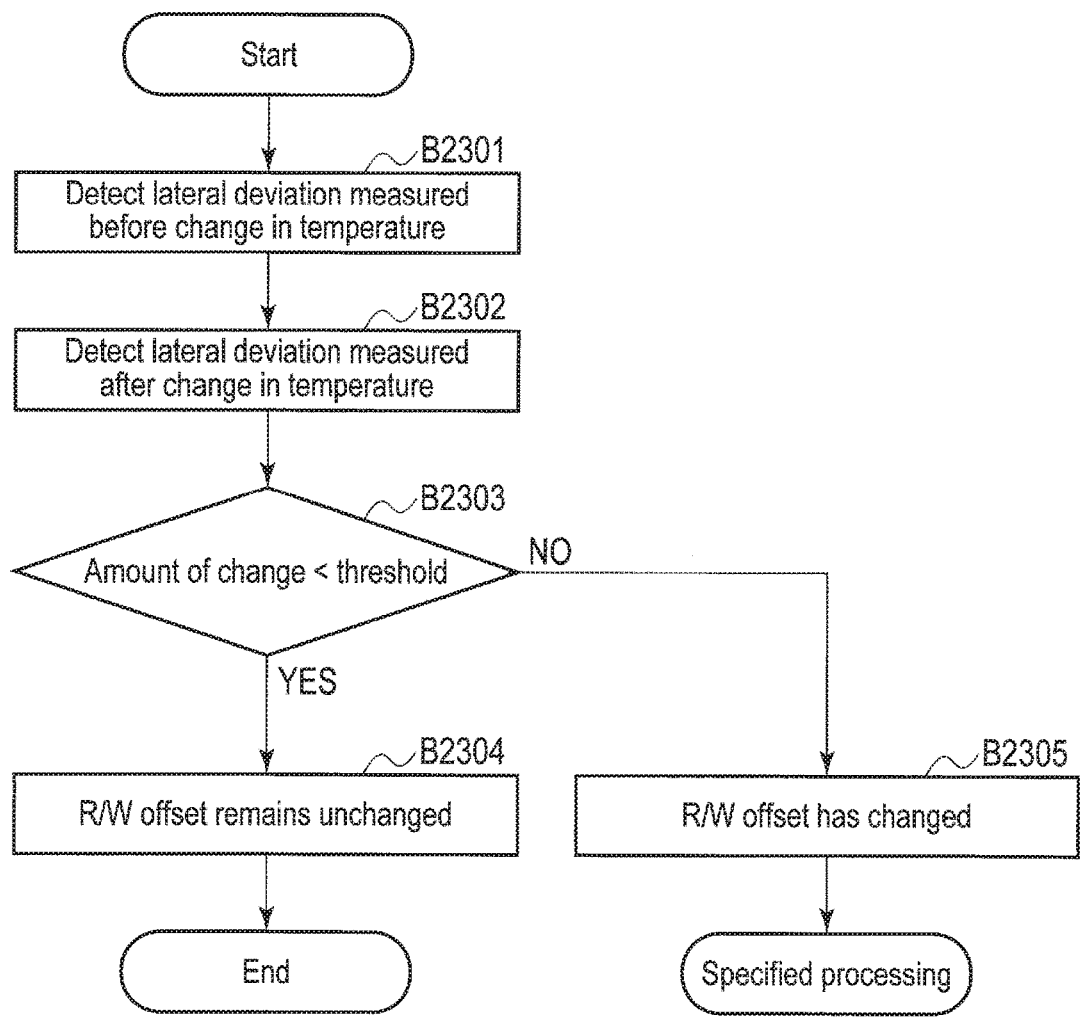
FIG. 23 is a flowchart of a detection method for a change in R/W offset resulting from a change in the temperature of the head.

FIG. 23 is a flowchart of a detection method for a change in R/W offset OF1 resulting from a change in the temperature of the head 15.

The MPU 60 acquires the lateral deviation CS measured before a change in the temperature of the head 15 (B2301), and detects the lateral deviation CS measured after the change in the temperature of the head 15 (B2302). The MPU 60 determines whether the amount of change between the lateral deviation CS measured before the change in the temperature of the head 15 and the lateral deviation CS measured after the change is smaller than a threshold or greater than or equal to the threshold (B2303). In a case of determining that the amount of change is smaller than the threshold (YES in B2303), the MPU 60 determines that the R/W offset OF1 remains unchanged (B2304) and ends the processing. In a case of determining that the amount of change is greater than or equal to the threshold (NO in B2303), the MPU 60 determines that the R/W offset OF1 has changed (B2305) and executes a specified process.

According to the second embodiment, the magnetic disk device 1 detects the amount of change between the lateral deviation. CS measured before a change in the temperature of the head 15 and the lateral deviation HCS measured after the change. In a case of determining that the amount of change is greater than or equal to the threshold, the magnetic disk device 1 determines that the R/W offset OF1 has changed and executes the specified process. This allows the magnetic disk device 1 to prevent the track adjacent to the track currently being written by the write head 15W to be erased after the change in the temperature of the head. The magnetic disk device 1 is also capable of preventing read of the data written after the change in the temperature of the head 15, based on the R/W offset measured before the change in the temperature of the head 15 and which make cause a read error. Therefore, the magnetic disk device 1 is capable of performing efficient offset correction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head comprising a write head configured to write data to the disk and a first read head and a second read head configured to read data from the disk; and
   a controller configured to generate a correction value based on placement information on the write head and the first read head and the second read head in a case where the first read head and the second read head are placed in tandem along a second direction orthogonal to a first direction coinciding with a radial direction of the disk, a first distance between the first read head and the second read head in the first direction in a case where the first read head is placed at a first position of the disk, and a second distance between the first read head and the second read head in the second direction in a case where the first read head is placed at the first position of the disk, and to correct a position of said head based on the correction value in a case where first data written with the first read head placed at the first position is read.

2. The magnetic disk device of claim 1, wherein the placement information includes a third distance between the write head and the first read head in the first direction coinciding with the radial direction, a fourth distance between the write head and the first read head in the second direction, and a fifth distance between the first read head and the second read head in the second direction.

3. The magnetic disk device of claim 2, wherein the controller is configured to generate a sixth distance between the write head and the first read head in the first direction based on the first distance to the fifth distance in a case where the first read head is placed at the first position.

4. The magnetic disk device of claim 3, wherein the controller is configured to correct a position of the first read head using the sixth distance as the correction value in a case where the first data is read by the first read head.

5. The magnetic disk device of claim 3, wherein the controller is configured to correct a position of the second read head based on the correction value resulting from adjustment of the sixth distance based on the first distance in a case where the first data is read by the second read head.

6. The magnetic disk device of claim 3, wherein the controller is configured to correct a position of an intermediate portion between the first read head and the second read head based on the correction value resulting from adjustment of the sixth distance based on a seventh distance which is half the first distance in a case where the first data is read by the first read head and the second read head.

7. The magnetic disk device of claim 3, wherein the controller is configured to correct said head based on the correction value resulting from adjustment of the sixth distance based on a first spacing by which a first central portion of the first data is separated from a second central portion of the write head in the first direction in a case where the first and second central portions are separated from each other by the first spacing in the first direction.

8. The magnetic disk device of claim 3, wherein the controller is configured to acquire the first distance in a case where said head is at a first temperature, to detect an eighth distance between the first read head and the second read head in the first direction in a case where said head is at a second temperature different from the first temperature, and to determine that the sixth distance has changed in a case where an amount of change between the eighth distance and the first distance is greater than or equal to a threshold.

9. The magnetic disk device of claim 3, wherein the controller is configured to acquire the first distance in a case where said head is at a first temperature, to detect an eighth distance between the first read head and the second read head in the first direction in a case where said head is at a second temperature different from the first temperature, and to determine that the sixth distance remains unchanged in a case where an amount of change between the eighth distance and the first distance is smaller than a threshold.

10. The magnetic disk device of claim 1, wherein the controller comprises a first demodulator configured to demodulate data read by the first read head and a second demodulator configured to demodulate data read by the second read head.

11. The magnetic disk device of claim 1, wherein the first read head is placed farther from the write head than the second read head.

12. A read/write offset correction method applied to a magnetic disk device comprising a disk, a head comprising a write head configured to write data to the disk and a first read head and a second read head configured to read data from the disk, the method comprising:
 generating a correction value based on placement information on the write head and the first read head and the second read head in a case where the first read head and the second read head are placed in tandem along a second direction orthogonal to a first direction coinciding with a radial direction of the disk, a first distance between the first read head and the second read head in the first direction in a case where the first read head is placed at a first position of the disk, and a second distance between the first read head and the second read head in the second direction in a case where the first read head is placed at the first position of the disk; and
 correcting as position of said head based on the correction value in a case where first data written with the first read head placed at the first position is read.

13. The read/write offset correction method of claim 12, wherein the placement information includes a third distance between the write head and the first read head in the first direction coinciding with the radial direction, a fourth distance between the write head and the first read head in the second direction, and a fifth distance between the first read head and the second read head in the second direction.

14. The read/write offset correction method of claim 13, further comprising:
 generating a sixth distance between the write head and the first read head in the first direction based on the first distance to the fifth distance in a case where the first read head is placed at the first position.

15. The read/write offset correction method of claim 14, further comprising:
 correcting a position of the first read head using the sixth distance as the correction value in a case where the first data is read by the first read head.

16. The read/write offset correction method of claim 14, further comprising:
 correcting a position of the second read head based on the correction value resulting from adjustment of the sixth distance based on the first distance in a case where the first data is read by the second read head.

17. The read/write offset correction method of claim 14, further comprising:
 correcting a position of an intermediate portion between the first read head and the second read head based on the correction value resulting from adjustment of the sixth distance based on a seventh distance which is half the first distance in a case where the first data is read by the first read head and the second read head.

18. The read/write offset correction method of claim 14, further comprising:
 correcting said head based on the correction value resulting from adjustment of the sixth distance based on a first spacing by which a first central portion of the first data is separated from a second central portion of the write head in the first direction in a case where the first and second central portions are separated from each other by the first spacing in the first direction.

19. The read/write offset correction method of claim 14, further comprising:
 acquiring the first distance in a case where said head is at a first temperature, detecting an eighth distance between the first read head and the second read head in the first direction in a case where said head is at a second temperature different from the first temperature, and determining that the sixth distance has changed in a case where an amount of change between the eighth distance and the first distance is greater than or equal to a threshold.

20. The read/write offset correction method of claim 14, further comprising:
 acquiring the first distance in a case where said head is at a first temperature, detecting an eighth distance between the first read head and the second read head in the first direction in a case where said head is at a second temperature different from the first temperature, and determining that the sixth distance remains unchanged in a case where an amount of change between the eighth distance and the first distance is smaller than a threshold.

* * * * *